(12) United States Patent
Utsunomiya

(10) Patent No.: US 8,482,759 B2
(45) Date of Patent: Jul. 9, 2013

(54) PRINTING APPARATUS, INFORMATION PROCESSING DEVICE, AND PRINTING METHOD

(75) Inventor: Takeshi Utsunomiya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1141 days.

(21) Appl. No.: 11/755,163

(22) Filed: May 30, 2007

(65) Prior Publication Data
US 2007/0279673 A1 Dec. 6, 2007

(30) Foreign Application Priority Data
Jun. 2, 2006 (JP) ................. 2006-154837

(51) Int. Cl.
G04G 12/12 (2006.01)
H04N 1/00 (2006.01)
H04N 1/21 (2006.01)
G06F 3/12 (2006.01)
B65H 5/30 (2006.01)
B65H 43/02 (2006.01)

(52) U.S. Cl.
USPC ......... 358/1.15; 358/1.12; 358/402; 358/298; 358/296; 358/1.13; 270/58.02; 270/58.14; 271/292; 271/220; 271/287

(58) Field of Classification Search
USPC ............. 358/1.15, 1.12, 402, 298, 296, 1.13; 270/58.02, 58.14; 271/292, 220, 287
See application file for complete search history.

(56) References Cited

U.S. PATENT DOCUMENTS

| | | | | |
|---|---|---|---|---|
| 5,124,732 A | * | 6/1992 | Manzer et al. | 347/140 |
| 5,258,779 A | * | 11/1993 | Serizawa et al. | 346/134 |
| 5,412,480 A | * | 5/1995 | Serizawa et al. | 358/296 |
| 5,678,818 A | * | 10/1997 | Hayashi et al. | 271/292 |
| 5,830,320 A | * | 11/1998 | Park et al. | 162/164.1 |
| 6,068,724 A | * | 5/2000 | Barny et al. | 156/205 |
| 6,279,892 B1 | * | 8/2001 | Yoshida et al. | 270/58.02 |
| 6,570,605 B1 | * | 5/2003 | Kashiwazaki | 347/264 |
| 6,765,686 B2 | * | 7/2004 | Maruoka | 358/1.15 |
| 6,920,307 B2 | * | 7/2005 | Howe | 399/395 |
| 7,136,180 B2 | * | 11/2006 | Utsunomiya | 358/1.15 |
| 7,349,577 B2 | * | 3/2008 | Kaneda et al. | 382/190 |
| 7,986,890 B2 | * | 7/2011 | Murakami | 399/45 |
| 2001/0017646 A1 | * | 8/2001 | Jacob et al. | 347/156 |
| 2003/0137680 A1 | * | 7/2003 | Maruoka | 358/1.13 |
| 2003/0230561 A1 | * | 12/2003 | Kagawa et al. | 219/216 |
| 2005/0111015 A1 | * | 5/2005 | Tsujimoto | 358/1.9 |

FOREIGN PATENT DOCUMENTS

| | | |
|---|---|---|
| JP | 2000-225754 A | 8/2000 |
| JP | 2003-107965 A | 4/2003 |
| JP | 2005-070859 A | 3/2005 |
| JP | 2005-339217 A | 12/2005 |
| JP | 2006-053284 A | 2/2006 |

* cited by examiner

Primary Examiner — Akwasi M Sarpong

(74) Attorney, Agent, or Firm — Canon USA, Inc., IP Division

(57) ABSTRACT

A CPU of a printing apparatus selects one of a plurality of setting permission information items based on sheet property information in a case in which printing processing is performed employing a specific sheet type. Subsequently, the CPU of the printing apparatus performs a setting regarding each of a plurality of printing setting items so as to obtain a setting permitted in the selected setting permission information item in a case in which printing processing is performed employing a specific sheet type. Thus, a printing apparatus capable of executing the printing settings of a plurality of printing setting items appropriately is provided.

10 Claims, 23 Drawing Sheets

| ID | PAPER NAME | TYPE | GRAMMAGE | SURFACE NATURE | FIXING TEMPERATURE | PRINTING SPEED | TRANSFER VOLTAGE |
|---|---|---|---|---|---|---|---|
| 0002-0001 | CUSTOM PLAIN PAPER 1 | 2 | 95 g/m² | HIGH QUALITY | 179°C | 240 mm/sec | 1.0 KV |
| 0002-0002 | CUSTOM PLAIN PAPER 2 | 2 | 93 g/m² | HIGH QUALITY | 180°C | 240 mm/sec | 1.0 KV |
| 0236-0001 | ABC COATED 1 | 2 | 200 g/m² | COATED | 191°C | 200 mm/sec | 1.2 KV |
| 0236-0002 | ABC COATED 2 | 2 | 210 g/m² | COATED | 180°C | 200 mm/sec | 1.2 KV |
| 0237-0001 | ABC COATED 3 | 2 | 250 g/m² | COATED | 192°C | 240 mm/sec | 1.3 KV |

FIG. 9

| ID | PAPER NAME | TYPE | GRAMMAGE | SURFACE NATURE | FIXING TEMPERATURE | PRINTING SPEED | TRANSFER VOLTAGE |
|---|---|---|---|---|---|---|---|
| 0001-0000 | THIN PAPER | 1 | 70 g/m² | HIGH QUALITY | 177°C | 240 mm/sec | 0.9 KV |
| 0002-0000 | PLAIN PAPER | 1 | 90 g/m² | HIGH QUALITY | 180°C | 240 mm/sec | 1.0 KV |
| 0003-0000 | HEAVY PAPER | 1 | 150 g/m² | HIGH QUALITY | 182°C | 200 mm/sec | 1.1 KV |
| 0004-0000 | RECYCLED PAPER | 1 | 90 g/m² | RECYCLED | 180°C | 240 mm/sec | 1.0 KV |
| 0005-0000 | COATED PAPER 1 | 1 | 120 g/m² | COATED | 182°C | 200 mm/sec | 1.1 KV |
| 0006-0000 | COATED PAPER 2 | 1 | 180 g/m² | COATED | 184°C | 180 mm/sec | 1.2 KV |
| 0007-0000 | TAB PAPER 1 | 1 | 120 g/m² | HIGH QUALITY | 182°C | 200 mm/sec | 1.1 KV |
| 0008-0000 | TAB PAPER 2 | 1 | 180 g/m² | HIGH QUALITY | 184°C | 180 mm/sec | 1.2 KV |

FIG. 10

| ID | PAPER NAME | TYPE | GRAMMAGE | SURFACE NATURE | FIXING TEMPERATURE | PRINTING SPEED | TRANSFER VOLTAGE |
|---|---|---|---|---|---|---|---|
| 0101-0000 | AAA COMPANY PLAIN PAPER | 3 | 90 g/m² | HIGH QUALITY | 180°C | 240 mm/sec | 1.0 KV |
| ... | ... | ... | ... | ... | ... | ... | ... |
| 0234-0000 | ABC PAPER COATED HIGH GRADE 100 gsm | 3 | 100 g/m² | COATED | 187°C | 240 mm/sec | 1.0 KV |
| 0235-0000 | ABC PAPER COATED HIGH GRADE 150 gsm | 3 | 150 g/m² | COATED | 189°C | 240 mm/sec | 1.0 KV |
| 0236-0000 | ABC PAPER COATED HIGH GRADE 200 gsm | 3 | 200 g/m² | COATED | 191°C | 200 mm/sec | 1.2 KV |
| 0237-0000 | ABC PAPER COATED HIGH GRADE 250 gsm | 3 | 250 g/m² | COATED | 192°C | 240 mm/sec | 1.2 KV |
| 0238-0000 | ABC PAPER LABEL 170 gsm | 3 | 170 g/m² | COATED | 190°C | 200 mm/sec | 1.1 KV |
| 0239-0000 | DEF COMPANY RECYCLED PAPER 80 gsm | 3 | 80 g/m² | RECYCLED | 180°C | 180 mm/sec | 1.1 KV |
| 0240-0000 | DEF COMPANY RECYCLED PAPER 100 gsm | 3 | 100 g/m² | RECYCLED | 180°C | 200 mm/sec | 1.1 KV |
| 0241-0000 | DEF COMPANY RECYCLED PAPER 120 gsm | 3 | 120 g/m² | RECYCLED | 180°C | 180 mm/sec | 1.2 KV |
| ... | ... | ... | ... | ... | ... | ... | ... |
| 1100-0000 | ZZZ COMPANY PLAIN PAPER | 3 | 93 g/m² | HIGH QUALITY | 180°C | 240 mm/sec | 1.0 KV |

FIG. 11

| ID | PAPER NAME | TYPE | GRAMMAGE | SURFACE NATURE | FIXING TEMPERATURE | PRINTING SPEED | TRANSFER VOLTAGE |
|---|---|---|---|---|---|---|---|
| 0002-0001 | CUSTOM PLAIN PAPER 1 | 2 | 95 g/m² | HIGH QUALITY | 179°C | 240 mm/sec | 1.0 KV |
| 0002-0002 | CUSTOM PLAIN PAPER 2 | 2 | 93 g/m² | HIGH QUALITY | 180°C | 240 mm/sec | 1.0 KV |
| 0236-0001 | ABC COATED 1 | 2 | 200 g/m² | COATED | 191°C | 200 mm/sec | 1.2 KV |
| 0236-0002 | ABC COATED 2 | 2 | 210 g/m² | COATED | 180°C | 200 mm/sec | 1.2 KV |
| 0237-0001 | ABC COATED 3 | 2 | 250 g/m² | COATED | 192°C | 240 mm/sec | 1.3 KV |

FIG. 12

| REGISTER SHEET | | |
|---|---|---|
| PAPER NAME | GRAMMAGE | |
| 1201 — ABC PAPER COATED HIGH GRADE 100 gsm | 100 g/m² | ▲ |
| 1202 — ABC PAPER COATED HIGH GRADE 150 gsm | 150 g/m² | |
| 1203 — ABC PAPER COATED HIGH GRADE 200 gsm | 200 g/m² | |
| 1204 — ABC PAPER COATED HIGH GRADE 250 gsm | 250 g/m² | |
| 1205 — ABC PAPER LABEL 170 gsm | 170 g/m² | |
| 1206 — DEF COMPANY RECYCLED PAPER 80 gsm | 80 g/m² | |
| 1207 — DEF COMPANY RECYCLED PAPER 100 gsm | 100 g/m² | |
| 1208 — DEF COMPANY RECYCLED PAPER 120 gsm | 120 g/m² | ▼ |

| EDIT PAPER | | | |
|---|---|---|---|
| ■ NAME OF PAPER | CUSTOM PLAIN PAPER 1 | CHANGE ▶ | ~1301 |
| ■ TYPE | TYPE 2 | | |
| ■ GRAMMAGE | 95 g/m² | CHANGE ▶ | ~1302 |
| ■ SURFACE NATURE | HIGH QUALITY | CHANGE ▶ | ~1303 |
| ■ FIXING TEMPERATURE | 179°C | CHANGE ▶ | ~1304 |
| ■ PRINTING SPEED | 240 mm/sec | CHANGE ▶ | ~1305 |
| ■ TRANSFER VOLTAGE | 1.0 KV | CHANGE ▶ | ~1306 |

| SHEET SUPPLY TRAY | SHEET ID |
|---|---|
| CASSETTE 311 | 0001-0000 |
| CASSETTE 312 | 0002-0000 |
| CASSETTE 313 | 0002-0001 |
| CASSETTE 314 | 0236-0002 |
| MANUAL FEED TRAY 315 | 0002-0002 |

FIG. 15

| SHEET SIZE | PAPER TYPE | DUPLEX-CAPABLE | SUPPLY SOURCE ||| DISCHARGE LOCATION |||
|---|---|---|---|---|---|---|---|---|
| | | | CASSETTE 1 | CASSETTE 2 | MANUAL FEED | DISCHARGE TRAY | CASE BINDING DEVICE | TRIMMING DEVICE |
| A4 | THIN PAPER | ○ | ○ | ○ | ○ | ○ | ○ | × |
| | PLAIN PAPER | ○ | ○ | ○ | ○ | ○ | ○ | × |
| | HEAVY PAPER | × | ○ | ○ | ○ | ○ | × | × |
| | RECYCLED PAPER | ○ | ○ | ○ | ○ | ○ | ○ | × |
| | COATED PAPER 1 | × | ○ | ○ | ○ | ○ | ○ | × |
| | COATED PAPER 2 | ○ | ○ | ○ | ○ | ○ | × | × |
| | TAB PAPER 1 | × | × | × | ○ | ○ | × | × |
| | TAB PAPER 2 | × | × | × | ○ | ○ | × | × |
| A3 | THIN PAPER | ○ | ○ | ○ | ○ | ○ | ○ | ○ |
| | PLAIN PAPER | ○ | ○ | ○ | ○ | ○ | ○ | ○ |
| | HEAVY PAPER | × | ○ | ○ | ○ | ○ | × | ○ |
| | RECYCLED PAPER | ○ | ○ | ○ | ○ | ○ | ○ | ○ |
| | COATED PAPER 1 | × | ○ | ○ | ○ | ○ | ○ | ○ |
| | COATED PAPER 2 | ○ | ○ | ○ | ○ | ○ | × | × |
| | TAB PAPER 1 | ○ | × | × | ○ | ○ | × | × |
| | TAB PAPER 2 | × | × | × | ○ | ○ | × | × |

FIG. 16

| SHAPE | SURFACE NATURE | GRAMMAGE (g/m²) | | |
| --- | --- | --- | --- | --- |
| | | 60 TO 80 | 81 TO 100 | 101 TO 200 |
| NORMAL | HIGH QUALITY | THIN PAPER | PLAIN PAPER | HEAVY PAPER |
| | RECYCLED | RECYCLED PAPER | | |
| | COATED | COATED PAPER 1 | COATED PAPER 2 | |
| | TRANSPARENCY | FILM | | |
| TAB | HIGH QUALITY | TAB PAPER 1 | | TAB PAPER 2 |

PRINTING APPARATUS, INFORMATION PROCESSING DEVICE, AND PRINTING METHOD

BACKGROUND OF THE INVENTION

1. Field of the Invention

The present invention relates to a printing apparatus, an information processing device, and a printing method.

2. Description of the Related Art

A technique has been known wherein an operator is allowed to set a plurality of printing setting items at the time of printing processing being performed by a printing apparatus. Examples of the printing setting items mentioned here include an item to which a sheet supply source is set, which indicates from which sheet supply cassette sheets should be supplied in the event that a printing apparatus includes a plurality of sheet supply cassettes. Also, for example, in the event that duplex printing can be performed by a printing apparatus, there is an item regarding which whether to perform duplex printing or simplex printing is set.

With such a printing apparatus capable of setting a plurality of printing setting items, a combination of a plurality of printing setting items sometimes results in an inexecutable setting at the printing apparatus. For example, in the event that duplex printing of heavy paper is mechanically impossible at the printing apparatus, an arrangement which allows setting of heavy paper as a paper type and then setting to perform duplex printing, the printing apparatus will malfunction. In order to avoid such a malfunction, a technique has been known wherein information indicating settable combinations regarding a plurality of printing setting items (hereafter, referred to as setting permission information) is stored beforehand, thereby preventing printing settings that disable the printing apparatus from performing printing processing (e.g., Japanese Patent Laid-Open No. 2000-225754).

However, with a technique described in Japanese Patent Laid-Open No. 2000-225754, a problem occurs in a case in which an operator of a printing apparatus can newly register a sheet as a sheet which can be employed for executing printing processing.

For example, in a case in which several hundreds through several thousands of types can be newly registered as the types of printing sheets to be employed at the printing apparatus, it is difficult to prepare the setting permission information regarding each type. The difficulty mentioned here is in that it takes time and effort to prepare the setting permission information as to all the types of printing sheets, which also requires storage capacity to store the setting permission information.

SUMMARY OF THE INVENTION

The present invention has been made in light of such a problem, and provides an improved printing apparatus, an improved information processing device, and an improved printing method.

Further, according to the present invention, in the event of performing printing processing employing an printing apparatus by which an operator can register the type of a sheet, setting permission information indicating the combinations of settable contents at each printing setting item regarding a plurality of printing setting items for performing printing processing can be prevented from increase according to the type of a sheet, and the printing settings of the plurality of printing setting items can be performed appropriately.

According to another aspect of the present invention, a printing apparatus is provided which includes a printing unit configured to perform printing processing; a sheet information storing unit configured to store a plurality of sheet information items, each of the sheet information items including a plurality of attribute information items on the material of a sheet; a permission information storing unit configured to store a plurality of permission information items, each of the permission information items indicating whether to permit a specific printing setting when the printing unit performs printing processing; a selecting unit configured to select one permission information item from among the plurality of permission information items based on the sheet information items corresponding to the specific sheet type in a case where the printing unit performs printing processing on a specific sheet type; a setting unit configured to set a printing setting for the printing unit performing printing processing based on the permission information items selected by the selecting unit; and a control unit configured to control the printing unit to perform printing processing based on the printing setting set by the setting unit.

According to another aspect of the present invention, an information processing device is provided which is configured to generate a printing job arranged to cause a printing apparatus to perform printing processing. Here, the printing apparatus includes a sheet information storing unit configured to store a plurality of sheet information items, each of the sheet information items including a plurality of attribute information on the material of a sheet; a permission information storing unit configured to store a plurality of permission information items, each of the permission information items indicating whether to permit a specific printing setting when the printing apparatus performs printing processing; a selecting unit configured to select one permission information item from among the plurality of permission information items based on the sheet information items corresponding to the specific sheet type in a case where the information processing device generates a printing job employing a specific sheet type; a setting unit configured to set a printing setting relating to a printing job employing the specific sheet type based on the permission information items selected by the selecting unit; and a generating unit configured to generate a printing job for causing the printing apparatus to perform printing processing based on the printing setting set by the setting unit.

According to yet another aspect of the present invention, a printing method is provided which includes selecting one sheet information item from a plurality of sheet information items relating to attribute information for the material of a sheet which a printing apparatus can employ for printing processing; selecting a permission information item from a plurality of permission information items indicating whether to permit a specific printing setting when the print apparatus performs printing processing based on the selected sheet information items; setting printing settings when the printing apparatus performs printing processing based on the selected permission information item; and performing printing processing by the printing apparatus based on the set printing settings.

As many apparently widely different embodiments of the present invention can be made without departing from the spirit and scope thereof, it is to be understood that the invention is not limited to the specific embodiments thereof except as defined in the appended claims.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate numerous embodiments, features and aspects of the invention and, together with the description, serve to explain the principles of the invention.

FIG. 9 is a diagram illustrating example sheet information of Type 1.

FIG. 10 is a diagram illustrating example sheet information of Type 3.

FIG. 11 is a diagram illustrating example sheet information of Type 2.

FIG. 12 is a diagram illustrating example operating screen displayed on the operating unit.

FIG. 13 is a diagram illustrating an example operating screen displayed on the operating unit.

FIG. 14 is a diagram illustrating example sheet supply tray information.

FIG. 15 is a diagram illustrating example setting permission information.

FIG. 16 is a diagram illustrating a table for correlating the sheet information of Type 2 with the sheet information of Type 1.

DESCRIPTION OF THE EMBODIMENTS

Figure 1:
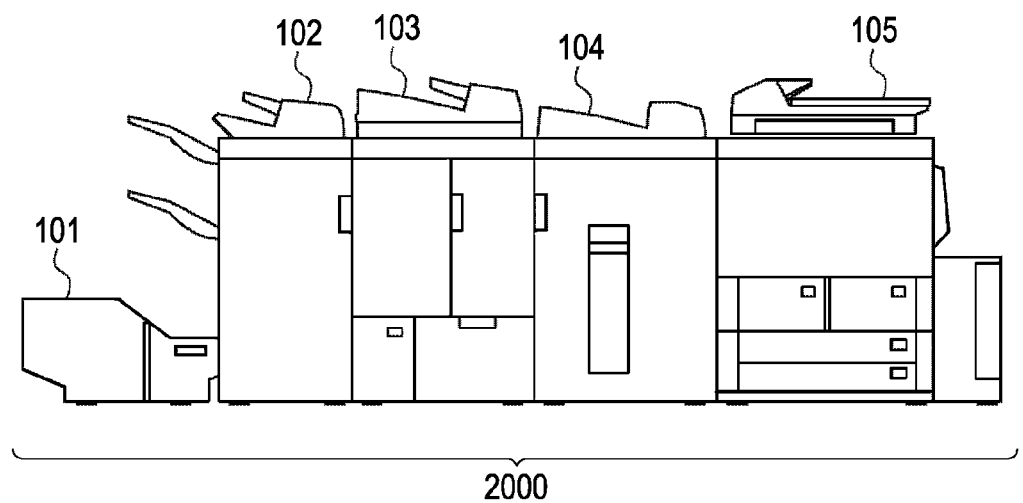
FIG. 1 is a diagram illustrating an overall example configuration of a bookbinding system.

The present invention will now be described in detail with reference to the drawings showing various embodiments thereof. In the drawings, components and parts which are similar throughout the drawings are designated by the same reference numerals, and redundant description thereof will be omitted.

Exemplary Embodiments

Description will be made below regarding various embodiments of the present invention with reference to the appended drawings.

First Exemplary Embodiment

<Overall Configuration of Bookbinding System (Bookbinding Apparatus)>

FIG. 1 is a diagram illustrating the overall configuration of a bookbinding system 2000 corresponding to an embodiment of the present invention.

In FIG. 1, reference numeral 105 denotes a printing apparatus, which subjects a sheet to printing processing based on image data, and also conveys the sheet subjected to printing processing to a stacker device 104. The stacker device 104 stacks the sheet conveyed from the printing apparatus 105 in a stack tray (not shown). The stacker device 104 can also convey the sheet conveyed from the printing apparatus 105 to a case-binding device 103 without stacking this in the stack tray. The case-binding device 103 loads a plurality of sheets S conveyed from the printing apparatus 105 via the stacker device 104 into a stacking tray as a sheet bundle. Subsequently, the case-binding device 103 creates a bound article (book) by wrapping the sheet bundle loaded into the stacking tray in a cover sheet loaded into a cover-sheet loading tray.

Note that the case-binding device 103 can convey the sheets S conveyed from the stacker device 104 to a saddle-stitching device 102 without loading these into the stacking tray. The saddle-stitching device 102 creates a saddle stitching article (book) by subjecting the sheet bundle S1 made up of the plurality of sheets S, which are conveyed from the printing apparatus 105 via the case binding device 103, to staple processing. Note that the saddle stitching article created by the saddle-stitching device 102 is conveyed to a trimming device 101, and is subjected to trimming processing.

Figure 2:
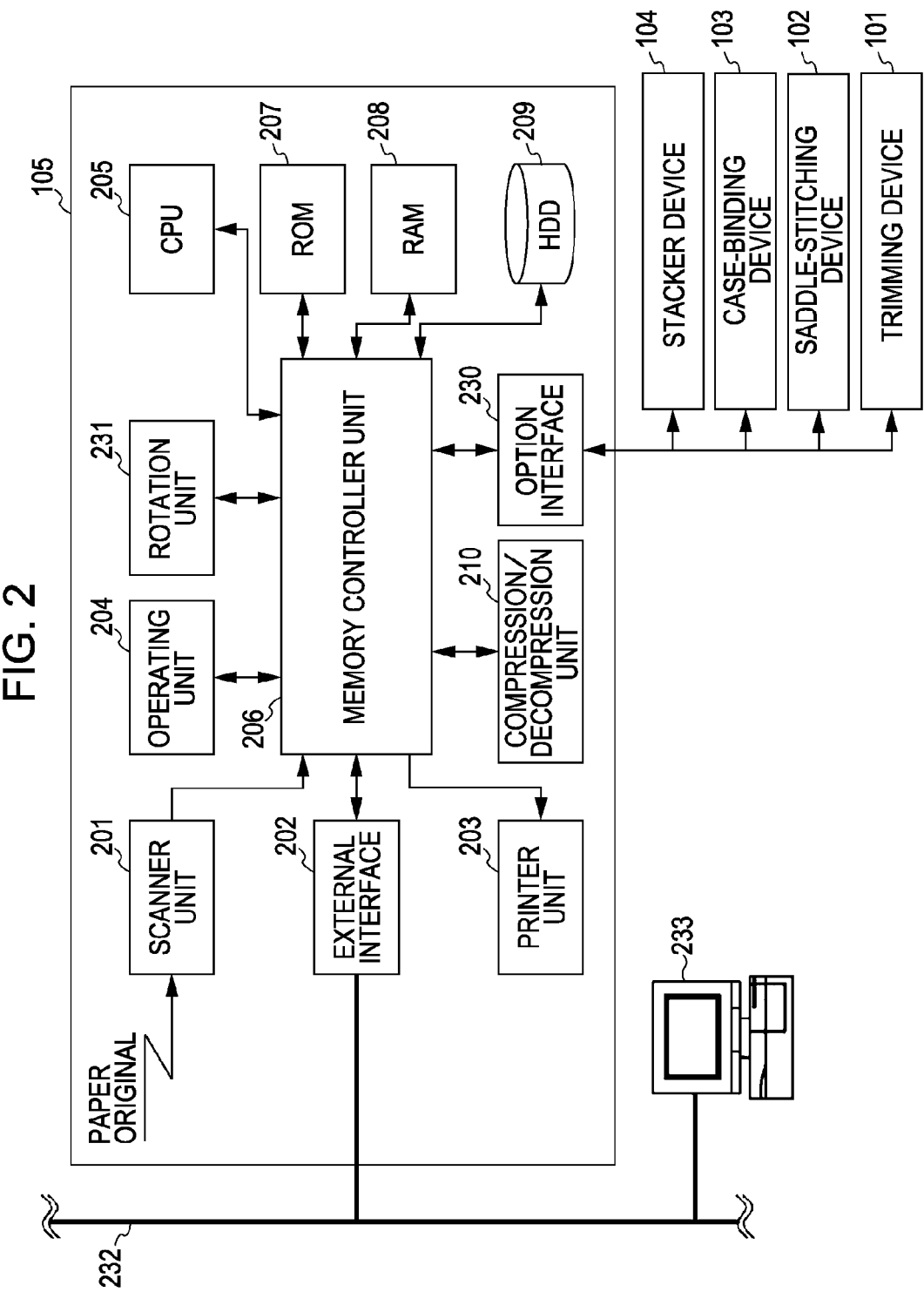
FIG. 2 is a block diagram illustrating an example control configuration of a printing apparatus.

FIG. 2 is a block diagram illustrating the control configuration of the printing apparatus 105 corresponding to an embodiment of the present invention.

In FIG. 2, reference numeral 201 denotes a scanner unit, which optically scans a plurality of original sheets (sheets such as paper or the like on which an image is printed) to generate image data, and also subjects the read image data to image processing (e.g., shading correction processing). The scanner unit 201 then stores the image data of a plurality of pages subjected to image processing in a hard disk (HDD) 209 as one printing job.

Reference numeral 202 denotes an external interface, which receives a printing job including image data of a plurality of pages from a computer terminal 233 serving as an external device connected to the printing apparatus 105 via a network 232. The external interface 202 stores the received printing job in the hard disk (HDD) 209. Reference numeral 203 denotes a printer unit, which subjects a plurality of sheets to printing processing based on the printing job stored in the hard disk 209. Note that the printing job is made up of image data of a plurality of pages, so that a plurality of image data is printed upon each of a plurality of sheets.

Reference numeral 204 denotes an operating unit, which accepts various types of instruction by an operator of the printing apparatus 105, and informs the accepted instruction to a memory controller unit 206, thereby performing various types of setting upon the printing apparatus 105.

A CPU 205 writes a program read out from ROM 207 in RAM 208, and executes the program using the RAM 208, thereby controlling the entirety of the bookbinding system 2000 including the printing apparatus 105. Note that the ROM 207 stores a program for interpreting PDL (Page Description Language) code data that the external interface 202 received from an external device as a printing job. The ROM 207 further stores a program for generating data that can be printed at the printer unit 203 following interpretation of PDL code data. The memory controller unit 206 controls access from the respective units as to the ROM 207, RAM 208, and hard disk 209.

A compression/decompression unit 210 can subject the image data stored in the RAM 208 and hard disk 209 to compression processing using various types of compression method such as JBIG, JPEG, or the like. The compression/decompression unit 210 can also execute decompression processing for decompressing the image data subjected to compression processing by various types of compression method.

A rotation unit 231 executes rotating processing in the event that it is necessary to rotate image data when transmitting the image data stored in the hard disk 209 to the printer unit 203 to execute printing processing. The rotation unit 231 can execute arbitrary angle rotating processing such as 180-degree rotating processing for inverting the top-and-bottom directions of image data, 90-degree rotating processing, or the like as rotating processing. Setting of a rotating angle for rotating processing can be performed from the CPU 205.

An option interface 230 is an interface for the CPU 205 communicating with the stacker device 104, case-binding device 103, saddle-stitching device 102, and trimming device 101 which are connected to the printing apparatus 105 as optional devices. The stacker device 104, case-binding device 103, saddle-stitching device 102, and trimming device 101 each include a CPU (not shown) configured to control the internal operation of each device. The CPU 205 of the printing apparatus 105 transmits a control command for controlling the CPU of each of the option devices via the option interface 230, thereby controlling the stacker device 104, case-binding device 103, saddle-stitching device 102, and trimming device 101.

<Configuration of Printing Apparatus>

Figure 3:
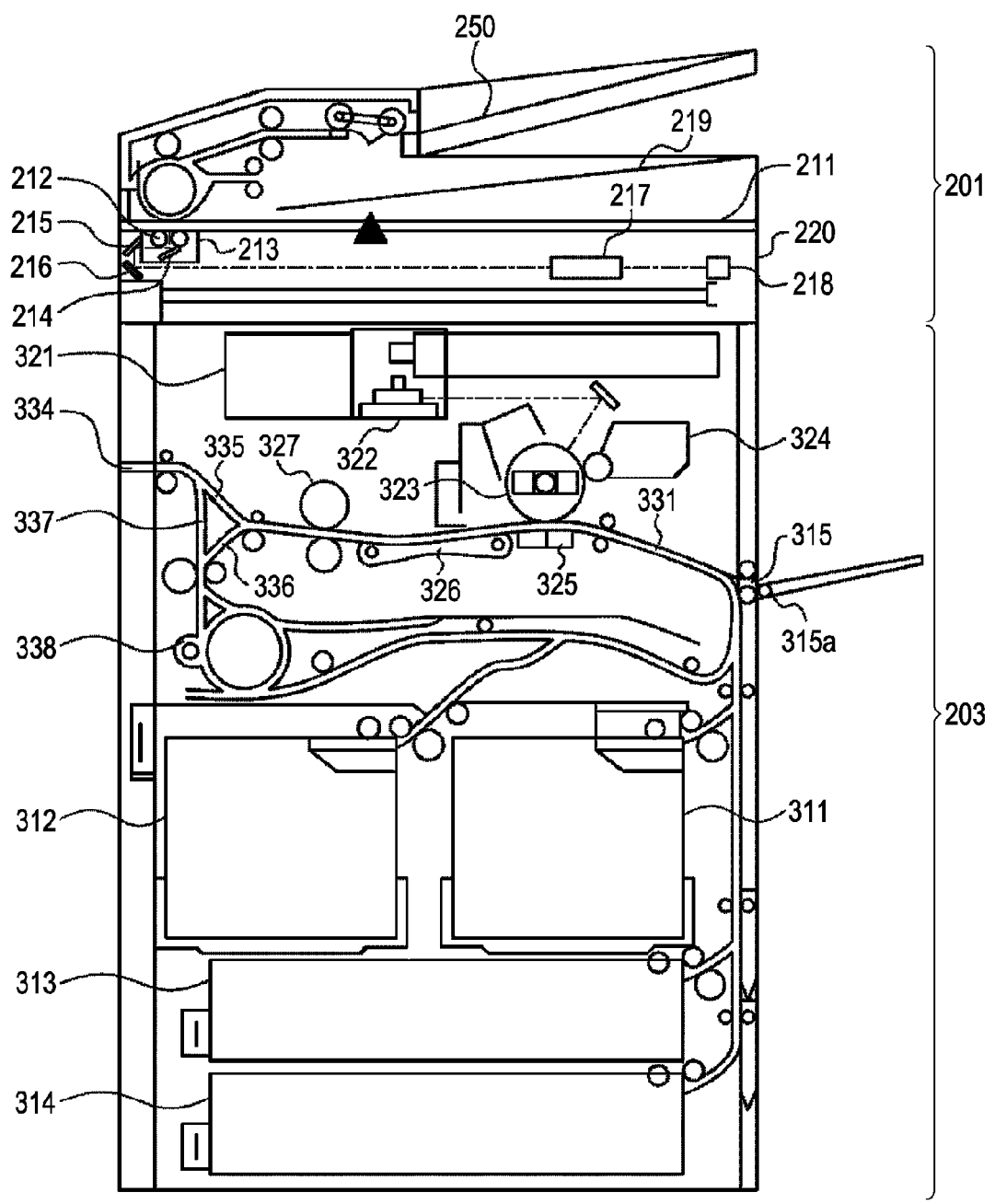
FIG. 3 is a diagram illustrating an example configuration of the printing apparatus.

Next, description will be made regarding the configuration of the printing apparatus 105 with reference to FIG. 3.

The printing apparatus 105 comprises the scanner unit 201, and the printer unit 203. The scanner unit 201 sequentially feeds the sheet bundle loaded in a document feeder unit 250 onto a platen glass 211 from the top thereof (the uppermost portion) one at a time in accordance with a loading sequence. The document feeder unit 250 then discharges the scanned sheet onto a discharge tray 219 following completion of scan operation by a scanning unit 220. Upon an original sheet being conveyed onto the platen glass 211, the scanning unit 220 turns on a lamp 212, controls an optical unit 213 to move, and scans the sheet-shaped original while illuminating this from below. The reflected light from the original is passed through a plurality of mirrors 214, 215, 216, and a lens 217, and is guided to a CCD image sensor (hereafter, CCD) 218, and the image on the scanned original is read by the CCD 218 as image data. The image data read by the CCD 218 is subjected to predetermined image processing, following which is stored in the hard disk 209.

The printer unit 203 outputs from a laser-light-emitting unit 322 driven by a laser driver 321 laser light corresponding to the image data read out from the hard disk 209. An electrostatic latent image corresponding to laser light is formed on a photosensitive drum 323 upon which laser light is illuminated, and a developing unit 324 adheres a developing agent (e.g., toner) at the electrostatic latent image portion.

A sheet S (not depicted) is fed from one of a cassette 311, a cassette 312, a cassette 313, a cassette 314, and a manual feed tray 315 at the timing in sync with start of illumination of laser light, and is conveyed to a transfer unit 325 via a conveyance channel 331. Here, the manual feed tray 315 is provided with a sheet detection sensor 315a configured to detect whether or not the sheet S is loaded. The transfer unit 325 transfers the developing agent adhered to the photosensitive drum 323 onto the sheet S. The sheet S on which the developing agent is transferred is conveyed to a fixing unit 327 by a conveyance belt 326, and is heated at the fixing unit 327. Thus, the developing agent on the sheet S is fixed to the sheet S. The sheet S on which the developing agent is fixed is conveyed to the stacker device 104 via conveyance channels 335 and 334. In the event of inverting and then conveying the sheet S at the time of conveying the sheet S to the stacker device 104, the CPU 205 controls the printer unit 203 so as to guide the sheet S to conveyance channels 336 and 338. Subsequently, the CPU 205 conveys the sheet S in the opposite direction to the stacker device 104 via conveyance channels 337 and 334.

Figure 6:
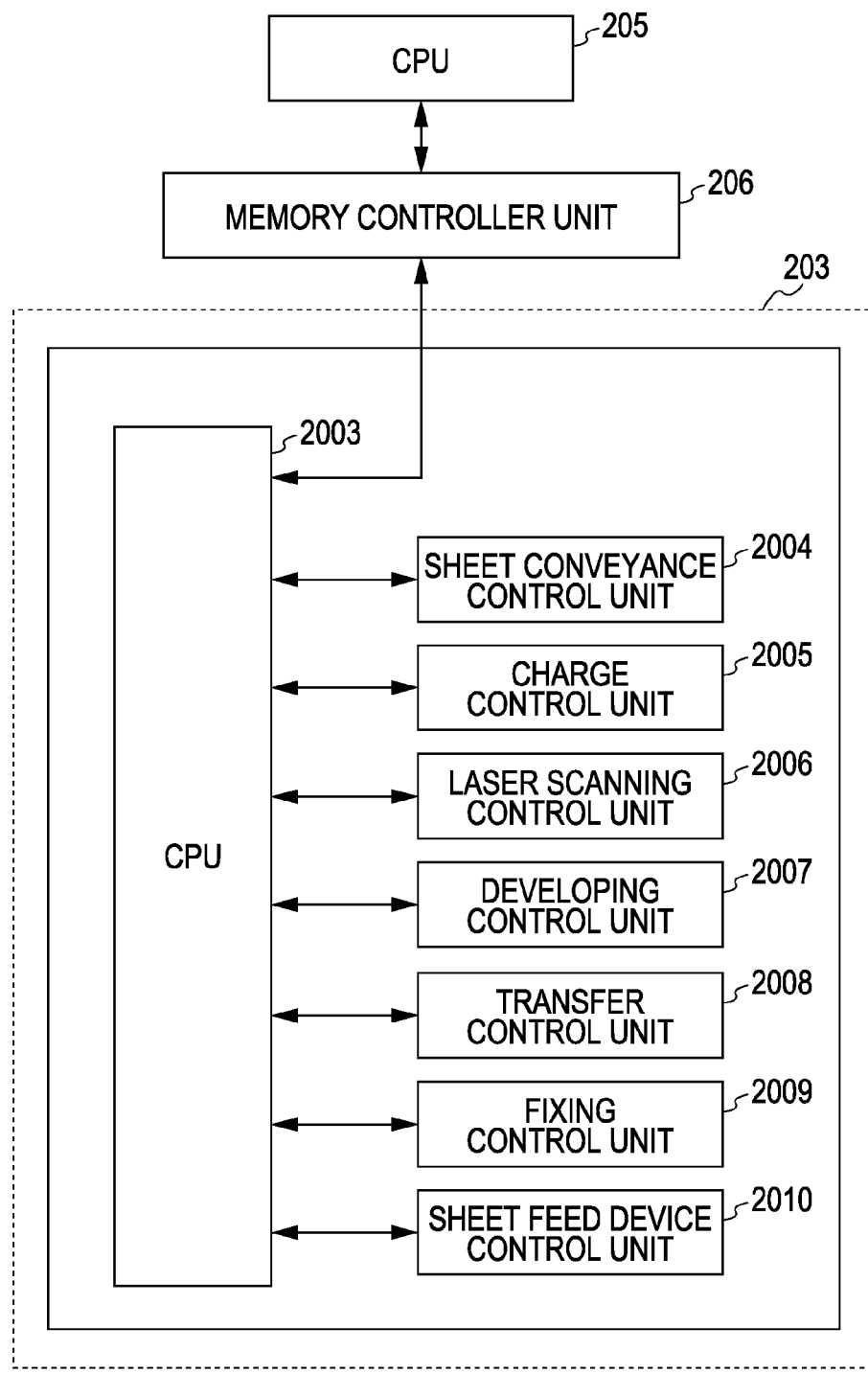
FIG. 6 is a block diagram illustrating an example control configuration of a printer unit 203.

Next, the control configuration of the printer unit 203 according to the first embodiment will be described with reference to FIG. 6.

The printer unit 203 included in the printing apparatus 105 is arranged so as to mutually communicate with the CPU 205 via the memory controller unit 206. A CPU 2003 of the printer unit 203 receives image data and a command for executing printing processing from the memory controller unit 206, and interprets the received image data to convert this into bit data, and also performs interpretation of the received command.

The printer unit 203 includes various types of control units which are controlled by the CPU 2003. As for various types of control units, there are provided a sheet conveyance control unit 2004 configured to control various types of rollers included in the printing apparatus 105 to convey a sheet S, and a charge control unit 2005 configured to control voltage to be applied to a charge roller to charge the photosensitive drum 323 up to a predetermined potential. Also, the printer unit 203 includes a laser scanning control unit 2006 configured to control scanning of laser for exposing the surface of the photosensitive drum 323 based on the image data which the CPU 203 received from the memory controller unit 206. Further, the printer unit 2003 includes a developing control unit 2007 configured to control a developer 324 to develop an electrostatic latent image formed on the surface of the photosensitive drum 323. Further, the printer unit 203 includes a transfer control unit 2008 configured to control transfer voltage to be applied to the transfer unit 325 so as to transfer a toner image formed on the photosensitive drum 323 onto the sheet S. Also, the printer unit 203 includes a fixing control unit 2009 configured to control the power supplied to a heater included in at least one of rotation and roller pair serving as a roller pair making up the fixing unit 327 so as to fix the transferred toner image onto the sheet S. Also, the printer unit 203 includes a sheet feed device control unit 2010 configured to control driving of rollers included in the cassette 311, cassette 312, cassette 313, and cassette 314 so as to supply the sheet S to the stacker device 104.

<Configuration of Operating Unit>

Next, the configuration of the operating unit 204 included in the printing apparatus 105 will be described with reference to FIG. 4.

The operating unit 204 comprises a hard key group 4-240 including various types of hard keys 4-241 through 4-246. The operating unit 204 also includes a liquid crystal display portion 4-250 made up of a dot matrix made up of a liquid crystal display device. The liquid crystal display portion 4-250 includes a touch panel on the surface thereof. The operating unit 204 detects whether or not key input is made by the operator of the printing apparatus 105 pressing a key display portion, and transmits the signal corresponding to key input to the CPU 205. Subsequently, the CPU 205 controls the printing apparatus 105 based on the program stored in the ROM 207, and executes the operation corresponding to the received signal.

A key 4-243 is a power key, which is a key for allowing the operator to turn on/off the power. A key 4-244 is a power saving key, which is a key for allowing the operator to set a power saving mode or to cancel the power saving mode. A start key 4-241 is a key for allowing the operator to input an instruction for starting various types of processing such as an instruction for starting the scan operation of an image on an original by the scanner unit 201. A stop key 4-242 is a key for allowing the operator to input an instruction for canceling the current operation by the bookbinding system 2000 including the printing apparatus 105.

Also, a key group 4-245 includes a numeric keypad with keys 0 through 9 for allowing the operator to input the number of copies, zoom enlargement/reduction, and so forth, and a clear key for allowing the operator to cancel input thereof. The number of copies input by this key group 4-245 is displayed on the liquid crystal display portion 4-253. A reset key 4-246 is a key for allowing the operator to return the setting conditions set by the operator via the liquid crystal display portion 4-250 and hard key group 4-240 to the initial state.

The liquid crystal display portion 4-250 displays the operation status and so forth of the bookbinding system 2000 in accordance with an instruction from the CPU 205. The liquid crystal display portion 4-250 also displays touch keys. With the liquid crystal display portion 4-250, a key 4-252 is a key for allowing the operator to select a cassette in which the sheets S (paper) employed for printing processing by the printing apparatus 105 are loaded. Upon the operator pressing this key, the CPU 205 controls the operating unit 204 to display a sheet selection screen illustrated in FIG. 5A on the liquid crystal display portion 4-250.

Figure 4:
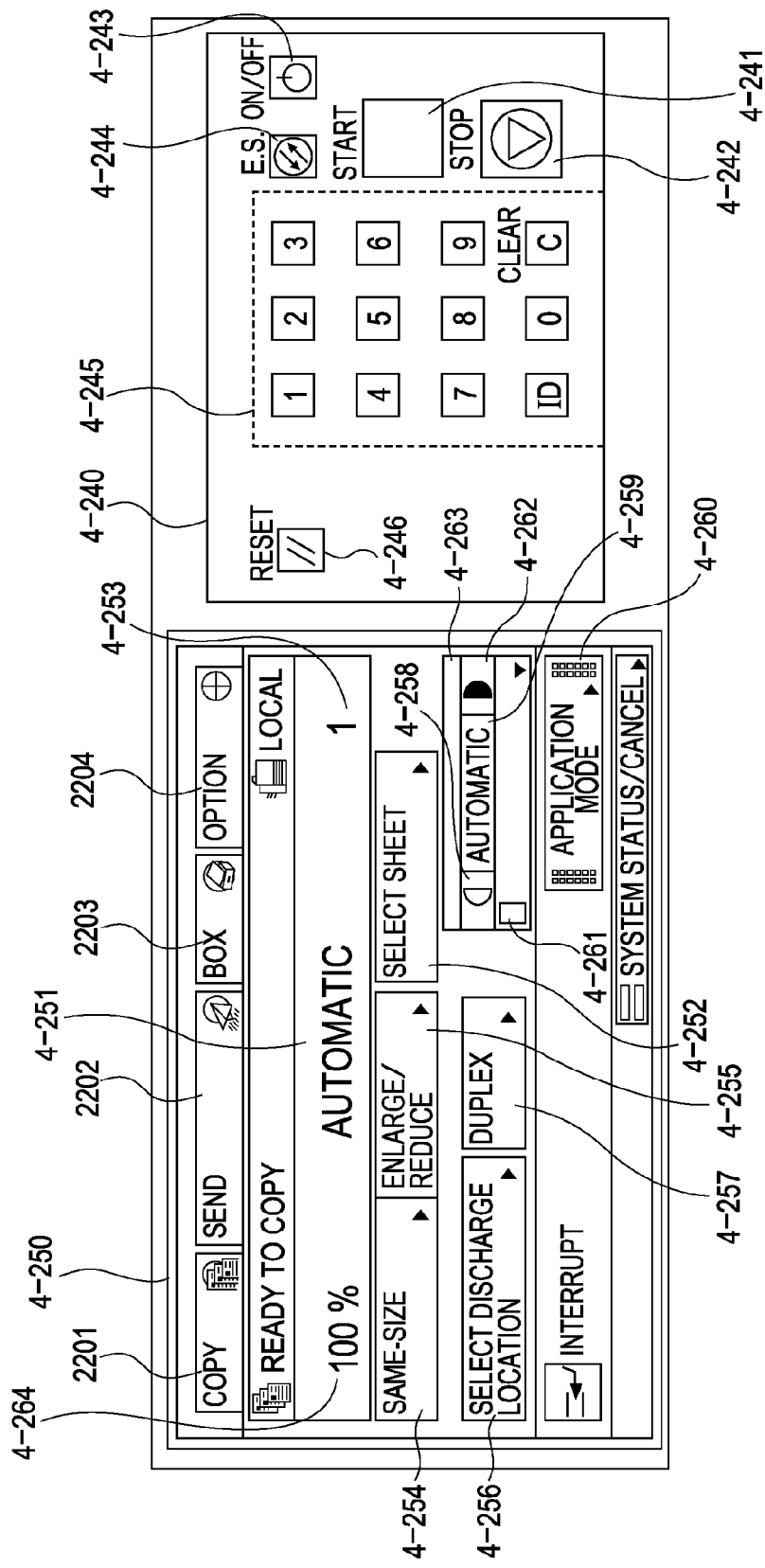
FIG. 4 is a diagram illustrating an example configuration of an operating unit.
Figure 5A:
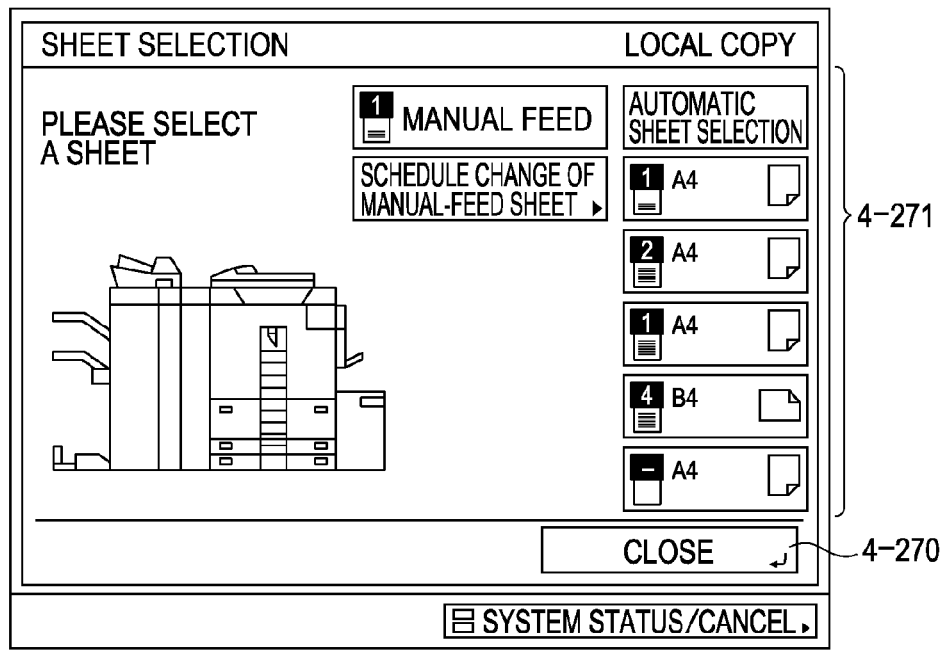
FIGS. 5A through 5C are diagrams each illustrating an example operating screen displayed on the operating unit.

According to a key group 4-271 of the sheet selection screen illustrated in FIG. 5A, a cassette (one of cassettes 311 through 315) used for printing processing is selected. Subsequently, upon the operator pressing a close key 4-270, the CPU 205 closes this screen to return to the screen in FIG. 4, and displays the selected cassette on the display portion 4-251.

Keys 4-258 and 4-262 shown in FIG. 4 are keys for allowing the operator to perform concentration adjustment. The CPU 205 displays the concentration adjusted by these keys on a display portion 4-263. A key 4-259 is a key for allowing the operator to activate/inactivate an automatic concentration adjustment function. A key 4-261 is a key for allowing the operator to perform settings such as a photo mode/text mode and so forth. A key 4-260 is provided for selecting application modes.

Figure 5B:
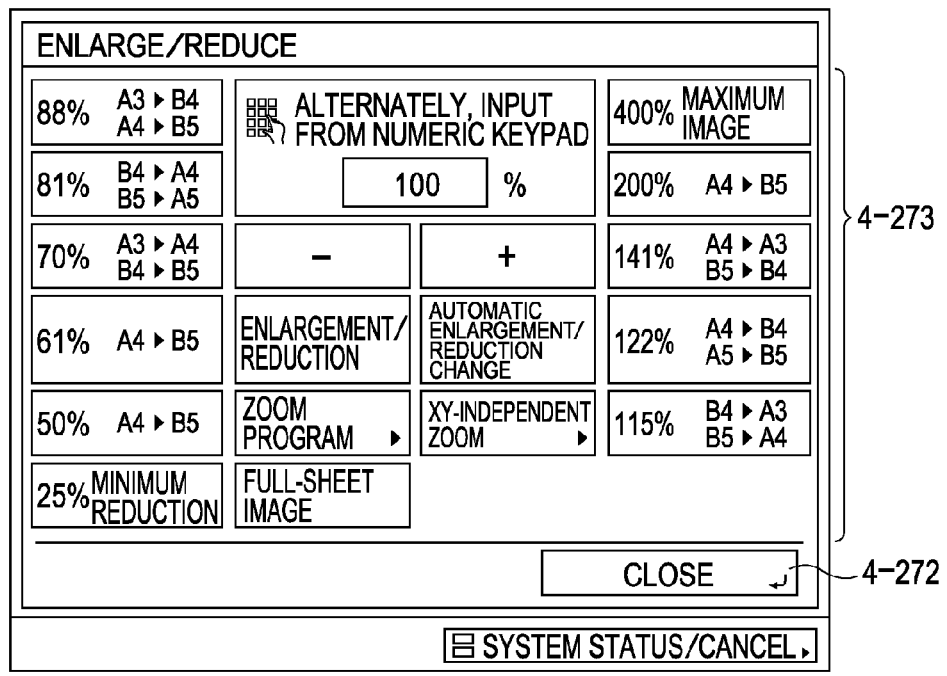

A key 4-254 and a key 4-255 are keys for allowing the operator to set the same size as originals, and reduction/enlargement, respectively. Upon the operator pressing the key 4-255, the CPU 205 displays the enlarge/reduce screen illustrated in FIG. 5B on the liquid crystal display portion 4-250 to allow the operator to set enlargement/reduction in detail. Upon the operator selecting a magnification using a key group 4-273 of the enlarge/reduce screen illustrated in FIG. 5B, and pressing a close key 4-272, the CPU 205 closes this screen to return to the screen in FIG. 4. Subsequently, the CPU 205 displays at 4-264 the magnification set in the previous operation on the display portion 4-251.

A key 4-257 is a duplex key. Upon the operator pressing the key 4-257, the CPU 205 displays the duplex/type selection screen illustrated in FIG. 5C on the liquid crystal display portion 4-250. Description will be made below regarding the settings of duplex printing with reference to FIG. 5C.

Figure 5C:
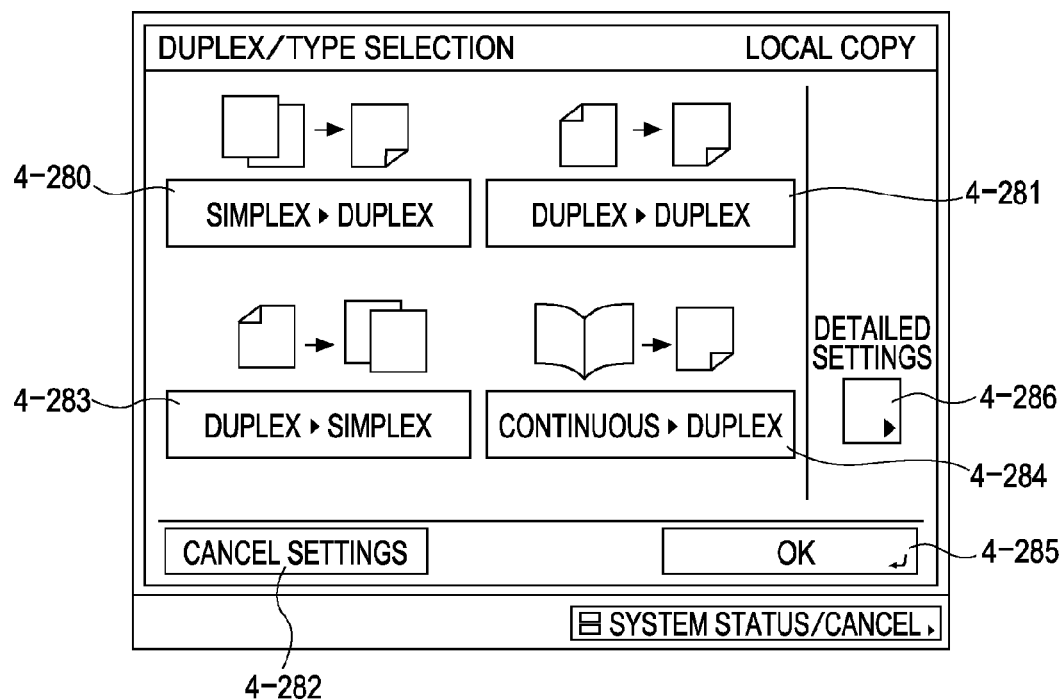

In FIG. 5C, a key 4-280 is a setting key for allowing the operator to subject both sides of sheets to printing processing using originals whose only one side is printed with an image (hereafter, simplex originals). A key 4-281 is a setting key for allowing the operator to subject both sides of sheets to printing processing using originals whose both sides are printed with an image (hereafter, duplex originals). A key 4-283 is a setting key for allowing the operator to subject only one side of sheets to printing processing using duplex originals. Also, a key 4-284 is a setting key for allowing the operator to perform continuous page scanning to duplex. A key 4-286 is for accessing a detailed settings display panel.

A key 4-285 is a key for allowing the operator to activate the settings performed by himself/herself in the duplex/type selection screen in FIG. 5C. Upon the operator pressing this key, the CPU 205 activates the settings in the duplex/type selection screen in FIG. 5C, and returns the display of the liquid crystal display portion 4-250 to the screen in FIG. 4. Also, a key 4-282 is a key for allowing the operator to cancel the settings performed in FIG. 5C. Upon the operator pressing this key, the CPU 205 inactivates the settings in the duplex/type selection screen in FIG. 5C, and returns the display of the liquid crystal display portion 4-250 to the screen in FIG. 4.

A key 4-256 on the display screen in FIG. 4 is a key for allowing the operator to input regarding whether to discharge the sheet subjected to printing processing by the printing apparatus 105 to which device in the bookbinding system 2000.

Figure 7:
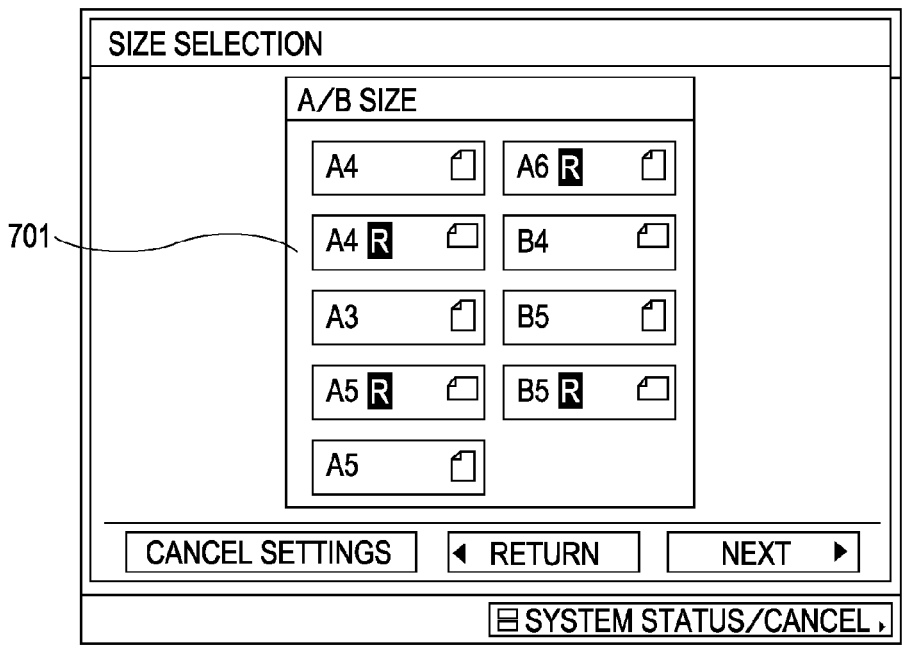
FIG. 7 is a diagram illustrating an example operating screen displayed on the operating unit.

FIG. 7 is an operating screen for specifying the size of the sheet S to be loaded in a sheet supply cassette (one of the cassettes 311 through 315). The operating screen shown in FIG. 7 is a screen displayed following one of the sheet supply cassettes (one of the cassettes 311 through 315) being selected in FIG. 5A. A key group 701 on the screen shown in FIG. 7 are keys for allowing the operator to set the size of sheets to be loaded in the cassette selected in FIG. 5A. For example, upon the operator pressing A4 size on the screen in FIG. 7, and pressing the Next key, the CPU 205 displays an operating screen shown in FIG. 8 on the liquid crystal display portion 4-250.

Figure 8:
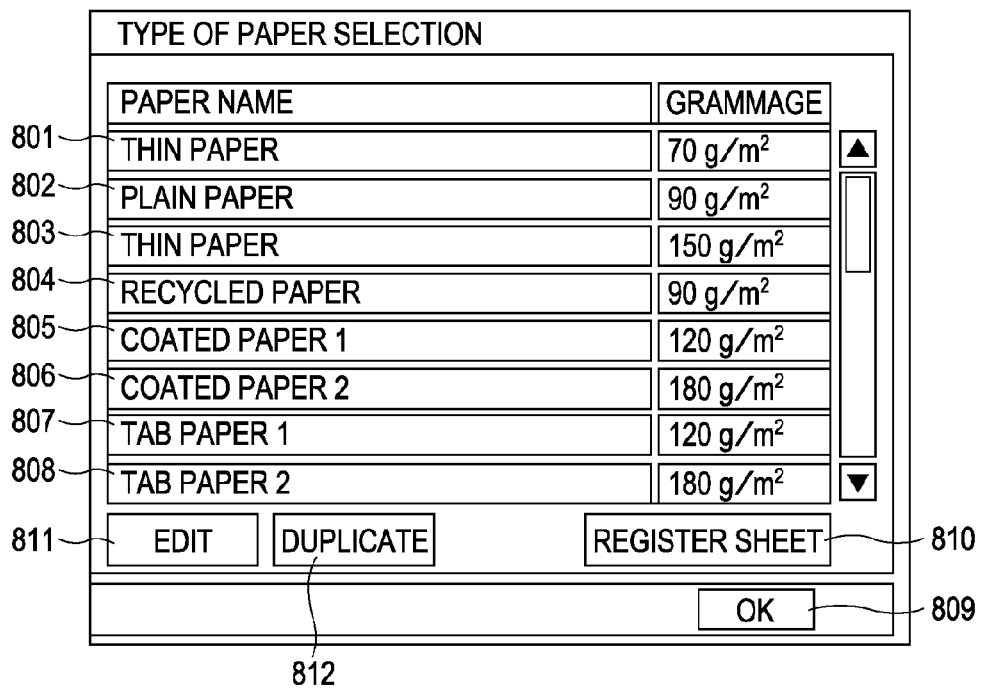
FIG. 8 is a diagram illustrating an example operating screen displayed on the operating unit.

FIG. 8 is a diagram illustrating a display screen of the operating unit 204 for allowing the operator to set the type of sheets to be loaded in a sheet supply tray.

In FIG. 8, upon the operator pressing one of keys 801 through 808, the type of sheets is set. Subsequently, upon the operator of the printing apparatus 105 pressing a key 809, the type of sheets is determined, and the screen returns to the operating screen shown in FIG. 5A.

As described above, with regard to sheets to be loaded in the cassette selected in FIG. 5A, the size of the sheets is set via the display screen shown in FIG. 7, and the type of the sheets is set via the display screen shown in FIG. 8. Subsequently, the CPU 205 stores a sheet ID assigned to the sheets set by the operator in the HDD 209 in a correlation with each of the sheet supply trays as sheet supply tray information. One example of the sheet supply tray information is shown in FIG. 14. For example, in the event of receiving a printing job from the computer terminal 233 to execute printing processing, a printing job specifying a sheet supply tray (supply source) alone is generated at the computer terminal 233 in some cases. In such a case, a printing job includes information determining a sheet supply tray, so the CPU 205 can determine the type of sheets employed for printing processing by referencing sheet supply tray information shown in FIG. 14.

Next, description will be made regarding sheet information to be stored in the HDD 209. The printing apparatus 105 executes printing processing using various types of control information at the time of executing printing processing at the printer unit 203. The control information mentioned here means information for controlling each unit of the printer unit 203, such as a temperature value when heating the fixing unit 327, a transfer voltage value to be applied at the transfer unit 325, a conveyance speed value (printing speed value) when a sheet is conveyed to the printer unit 203, and so forth. It can be conceived that the printing apparatus 105 executes printing processing using various types of sheets, but even whatever kind of sheet is employed, it is desirable to obtain a fixed printing result. In order to realize this, the printing apparatus 105 includes control information in the sheet information, thereby appropriately controlling transfer voltage, printing speed, and fixing temperature according to the type of sheets.

With the present embodiment, as for the sheet information, there are provided three types of sheet information, such as Type 1, Type 2, and Type 3.

First, description will be made regarding the sheet information of Type 1 serving as one type of the sheet information. Type 1 is the sheet information stored in the HDD 209 of the printing apparatus 105 beforehand (e.g., at the time of manufacturing), which is stored in the HDD 209 as a table shown in FIG. 9. In the table shown in FIG. 9, ID represents information for identifying various types of Type-1 sheets, and the CPU 205 of the printing apparatus 105 identifies the type of sheets by using this ID. Paper name represents a name assigned to sheets. Also, grammage represents a weight per 1 $m^2$ of a sheet, and surface nature represents the material quality of the surface of a sheet. Note that the weight of a sheet and the material quality of a sheet are information indicating the properties of a sheet itself, so this information is referred to as sheet property information in the following description.

Also, fixing temperature represents a temperature value at the time of heating the fixing unit 327, and printing speed represents a conveyance speed value at the time of conveying sheets in the event of executing printing processing at the printer unit 203. Also, transfer voltage represents a transfer voltage value to be applied to a sheet at the transfer unit 325. The sheets included in the Type-1 sheet information can be selected as sheets to be employed for printing processing from the operating unit 204 of the printing apparatus 105.

Specifically, an arrangement is made wherein the operator can select the sheets included in the Type-1 sheet information at the operating screen in FIG. 8. The example in FIG. 9 illustrates a case wherein eight types of sheets are registered in the HDD 209 of the printing apparatus 105 as Type-1 sheets, but the number of types of sheets is not restricted to eight, so an arbitrary number of types of sheets may be registered as Type 1 beforehand.

Next, description will be made regarding the sheet information of Type 3 serving as one type of the sheet information. Type 3 is the sheet information stored in the HDD 209 of the printing apparatus 105 beforehand (e.g., at the time of manufacturing), which is the same as the sheet information of Type 1. However, the difference between Type 3 and Type 1 is in that the sheets included in the Type 3 sheet information cannot be selected at the screen shown in FIG. 8 as the sheets which the printing apparatus 105 employs for printing processing. In other words, the sheets included in the Type 3 sheet information cannot be employed for printing processing by the printing apparatus 105, and can be employed for printing processing only by registering those sheets as later-described Type-2 sheet information. As for the sheets to be employed for printing processing, there are several thousands of types on the market, so enabling all these types of sheets to be employed for printing processing of the printing apparatus 105 causes a problem. Specifically, it is difficult for the operator to select a desired sheet from several thousands of types of sheets at the operating screen such as shown in FIG. 8. Consequently, the printing apparatus 105 allows the operator of the printing apparatus 105 to employ only the necessary types of sheets from among the Type-3 sheets.

Specifically, in the event that the sheets included in the Type 3 sheet information are arranged so as to be employed for printing processing by the printing apparatus 105, the operator of the printing apparatus 105 presses a register sheet key 810 on the operating screen shown in FIG. 8. The CPU 205 displays the operating screen shown in FIG. 12 on the operating unit 204 in response to the register sheet key 810 being pressed. With the operating screen shown in FIG. 12, the operator can select the sheets included in Type 3. With the example shown in FIG. 12, eight types of sheets equivalent to IDs 0234-0000 through 0241-0000 among the Type 3 are displayed so as to be selected by the operator. Upon the operator pressing the portion identifying these eight types of sheets (1201 through 1208), and pressing the OK key 1209, a new sheet is registered as the sheet that can be selected in FIG. 8, and as the Type-2 sheet information. According to such a registration, the sheet which the printing apparatus 105 can employ for printing processing is newly registered (added). Note that with the example shown in FIG. 12, an arrangement has been made wherein the eight types of sheets included in Type 3 can be selected, but a thousand types of sheets shown in FIG. 10 are included in Type 3, so with the screen shown in FIG. 12, let us say that the operator can select one of the thousands of types of sheets by scrolling and displaying the sheet information.

Next, description will be made regarding the sheet information of Type 2 serving as one type of the sheet information. The sheets included in the Type-2 sheet information means, of the sheets included in Type 3, the sheets which the printing apparatus 105 can newly employ for printing processing by the registration processing employing the screen shown in FIG. 12. Also, the operator can register a sheet included in Type 1 as a new Type-2 sheet by duplicating the sheet included in Type 1. In the event of performing duplication, the operator needs to press a duplicate key 812 in a state of the sheet included in Type 1 being selected on the operating screen shown in FIG. 8. Upon the operator pressing the key 812, a new sheet is added as a sheet of Type 2 separately from the Type-1 sheets. One example of the Type-2 sheet information is shown in FIG. 11. Note that the Type-2 sheet copied from Type 1 has the same sheet information as the Type-1 sheet, but sheet name thereof is rewritten so as not to be duplicated. Note that the sheet included in Type 2 can be edited by the operator pressing the edit key 811 in FIG. 8. As one example, description will be made regarding a case wherein of the Type-1 sheet information shown in FIG. 9, the sheet information whose ID is 0002-0000 is newly registered (duplicated) as the Type-2 sheet information. In this case, new sheet information is registered (duplicated) in Type 2 by the operator pressing the copy key 812 in a state of the key 802 shown in FIG. 8 being pressed. Subsequently, following the sheet registered as Type 2 being selected on the screen shown in FIG. 8, upon the operator pressing an edit key 811, the operating screen shown in FIG. 13 is displayed on the operating unit 204. Here, the operator of the printing apparatus 105 presses a modification key 1301, and on the screen (not shown) displayed thereafter performs character input employing the operating unit 204, whereby of the sheet information the operator can modify sheet name information. Also, the operator of the printing apparatus 105 presses a modification key 1302, and on the screen (not shown) displayed thereafter performs numeric input employing the operating unit 204, whereby the operator can modify weight information. Also, the operator of the printing apparatus 105 presses a modification key 1303, and on the screen (not shown) displayed thereafter performs selection processing (selection processing of one of high quality, recycled, and coated) employing the operating unit 204, whereby the operator can modify surface nature information. Also, the operator of the printing apparatus 105 presses a modification key 1304, and on the screen (not shown) displayed thereafter performs numeric input employing the operating unit 204, whereby the operator can modify fixing temperature information. Also, the operator of the printing apparatus 105 presses a modification key 1305, and on the screen (not shown) displayed thereafter performs numeric input employing the operating unit 204, whereby the operator can modify printing speed information. Also, the operator of the printing apparatus 105 presses a modification key 1306, and on the screen (not shown) displayed thereafter performs numeric input employing the operating unit 204, whereby the operator can modify transfer voltage information.

Note that the above-mentioned modification processing is executed by the CPU 205 rewriting the Type-2 sheet information items stored in the HDD 209 based on the information input to the operating unit 204. Also, as a result of the above-mentioned modification processing, the sheets including the Type-1 and Type-2 sheet information are displayed on the operating unit 204 as sheets which the printing apparatus 105 can employ for printing processing.

Next, the setting permission information indicating combinations of printing setting items that the printing apparatus 105 can subject to printing processing will be described.

In the event that the printer unit 203 performs printing processing employing image data input from the scanner unit 201, the operator of the printing apparatus 105 sets a plurality of printing setting items, following which it performs printing processing. Here, with the printing apparatus 105 capable of setting the plurality of printing setting items, a combination of the plurality of printing setting items sometimes results in an inexecutable setting. In order to avoid this, with regard to the plurality of printing setting items, setting permission information is stored beforehand as information indicating settable combinations, thereby preventing a printing setting that the printing apparatus cannot subject to printing processing.

FIG. 15 shows a table indicating the setting permission information, which includes a plurality of sets of setting permission information items for each sheet type. As for the printing setting items, FIG. 15 shows an item regarding whether or not duplex printing can be performed, an item that sets available cassettes as sheet supply sources, and an item that sets available devices as sheet discharge locations. Also, in the event that the plurality of sets of setting permission information have a different sheet size, different setting information even having the same sheet type exists. For example, with regard to A4-size plain paper, the trimming device 101 cannot be selected as a sheet discharge location, but duplex printing can be performed, and any cassette (or manual feed) can be selected as a sheet supply source, and the stacker device 104, case-binding device 103, and saddle-stitching device 102 can be selected. Note that as shown in FIG. 15, as for the sheet types, the sheet types equivalent to the Type-1 sheet information are prepared. Also, the plurality of sets of setting permission information are stored in the HDD 209.

Note that as for the setting permission information, it is difficult to prepare not only the information equivalent to the Type-1 information, but also the information equivalent to the Type-2 and Type-3 sheet information. For example, with the present embodiment, there are a thousand types of sheet as the Type 3 sheet information, so it is difficult to prepare setting permission information regarding all these types. In order to handle this, with the present embodiment, an arrangement is made wherein printing settings of the plurality of printing setting items can be performed suitably without increasing the setting permission information indicating combinations of the selectable contents of each printing setting item regarding the plurality of printing setting items for printing processing according to a sheet type. Specifically, the CPU 205 selects any one of the plurality of sets of setting permission information in FIG. 15 as to the Type-2 sheet information by using the table shown in FIG. 16. Thereby the CPU 205 can perform printing settings of the plurality of printing setting items without increasing the plurality of setting permission information. FIG. 16 is a table for correlating the Type-2 sheet information with the Type-1 sheet information.

Figure 17:
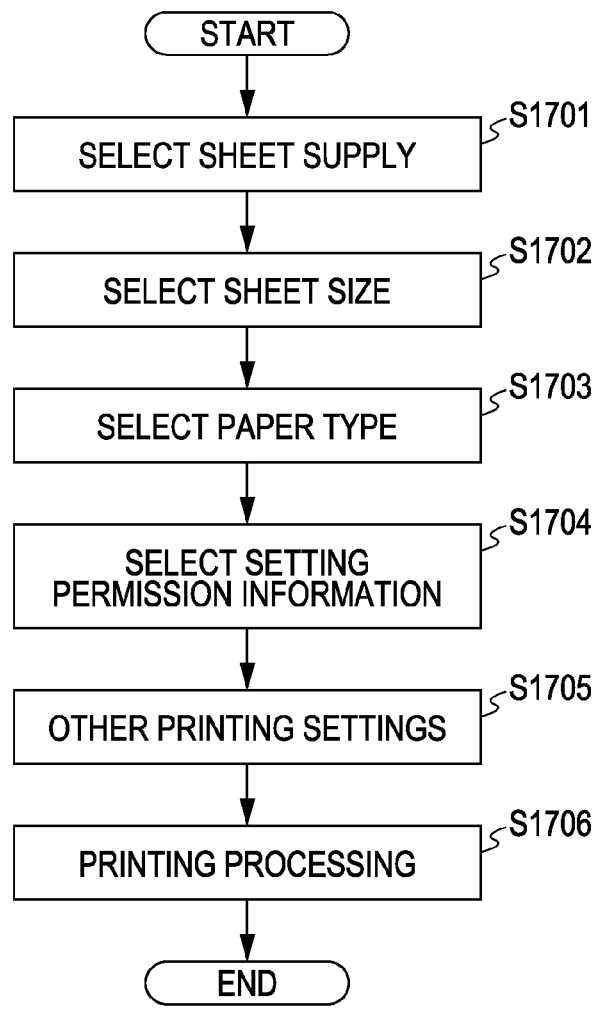
FIG. 17 is a flowchart illustrating an example operation executed by a CPU 205.

Next, description will be made with reference to FIG. 17 regarding an operation wherein the CPU 205 selects one of the plurality of setting permission information items with the Type-2 sheet information correlated with the Type-1 sheet information shown in FIG. 15, and executes printing processing. FIG. 17 shows an operation executed by the CPU 205 based on the control program stored in the HDD 209.

In step S1701 in FIG. 17, the CPU 205 selects the sheet supply source (one of the cassettes 311 through 314, and manual feed 315) selected by the operator via the operating screen shown in FIG. 5A as the sheet supply source employed for printing processing.

In step S1702, the CPU 205 selects (specifies) the sheet size selected by the operator at the operating screen shown in FIG. 7 to be displayed subsequently following the operating screen shown in FIG. 5A as the sheet size of the sheets employed for printing processing.

In step S1703, the CPU 205 selects the sheet type selected by the operator on the operating screen shown in FIG. 8 to be displayed subsequently following the operating screen shown in FIG. 7 as the sheet type of the sheets employed for printing processing. Note that with the example shown in FIG. 8, only the sheet information equivalent to Type 1 is displayed on the operating screen, but in this step, let us say that the screen to display the sheet information has been scrolled, and "ABC COATED 1" (ID=0236-0001) shown in FIG. 11 registered as Type 2 has been selected.

In step S1704, the CPU 205 selects the setting permission information item corresponding to the sheet type selected in step S1703 with reference to the sheet information corresponding to the sheet type selected in step S1703, and the tables shown in FIG. 15 and FIG. 16. Specifically, the CPU 205 selects "COATED PAPER 2" in FIG. 16, and further selects the setting permission information corresponding to "COATED PAPER 2" in FIG. 15 since the weight of the sheet type selected in step S1703 is 200 g/m$^2$, and the surface nature is "COATED". With the setting permission information selected by the CPU 205 in step S1704, duplex printing is unavailable, case-binding device is unavailable, and trimming device is unavailable.

In step S1705, the CPU 205 performs the other printing settings based on the setting permission information selected in step S1704. Here, description will be made regarding the setting item of duplex printing, and the setting item of a discharge location, which serve as printing setting items. First, in the event of performing the setting of duplex printing, the operator presses the key 4-257 on the operating screen in FIG. 4. In response to this, the CPU 205 displays the operating screen shown in FIG. 5C on the operating unit 204. Here, with the setting permission information selected in step S1704, the setting of duplex printing is unavailable, so the CPU 205 prevents the operator from pressing the key 4-280 and key 4-281 on the operating screen shown in FIG. 5C. That is to say, the CPU 205 controls so as not to allow the operator to execute duplex printing processing, in the event of employing "ABC COATED 1" of Type 2 at the printing processing. Next, in the event of performing the setting of a discharge location, the operator presses the key 4-256 on the operating screen in FIG. 4.

Figure 18:
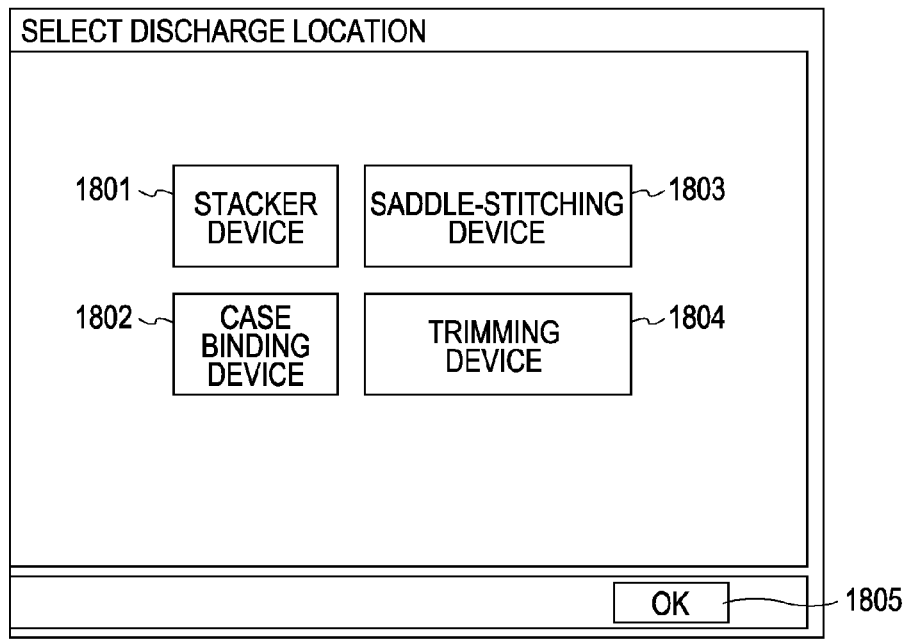
FIG. 18 is a diagram illustrating an example operating screen displayed on the operating unit.

In response to this, the CPU 205 displays a select discharge location operating screen shown in FIG. 18 at the operating unit 204. The selection discharge location operating screen includes selection keys 1801 through 1804 for selecting the device for discharge, in particular, a stacker device 1801, case binding device 1802, saddle-stitching device 1803, and trimming device 1804. Further, the screen includes an OK button 1805 to confirm the selection.

Here, with the setting permission information item selected in step S1704, the setting of the trimming device 101 serving as a discharge location is unavailable, so the CPU 205 prevents the operator from pressing a key 1804 on the operating screen shown in FIG. 18. That is to say, the CPU 205 controls so as not to allow the operator to specify the trimming device 101 as a discharge location, in the event of employing "ABC COATED 1" of Type 2 at the printing processing. Note that in the event of the operator of the printing apparatus 105 selecting the stacker device 104, case-binding device 103, or saddle-stitching device 102 on the operating screen shown in FIG. 18, the CPU 205 controls the operating unit 204 to display an operating screen (not shown) for allowing the operator to set the processing as to sheets at each of the devices.

In step S1706, the CPU 205 controls the printer unit 203 to execute printing processing based on the printing setting set in each step of step S1701 through step S1705. Note that step S1706 is started by the CPU 205 detecting whether or not the operator of the printing apparatus 105 presses the key 4-241 in FIG. 4 in a state in which a sheet bundle is loaded in the document feeder unit 250 of the scanner unit 201. Note that the CPU 2003, which controls the printer unit 203, controls each of the units of the printer unit 203 based on the sheet information corresponding to the sheet type selected in step S1703 in FIG. 17. "ABC COATED 1" (ID=0236-0001) has been selected as the sheet type in step S1703, so as shown in FIG. 11, the sheet information indicates that the fixing temperature is 191° C., printing speed is 200 mm/sec, and transfer voltage is 1.2 KV. Therefore, the CPU 2003 controls the fixing control unit 2009 such that the fixing temperature of the fixing unit 327 at the time of printing processing becomes 191° C. Also, the CPU 2003 controls the sheet conveyance control unit 2004 such that the conveyance speed of sheets at the time of printing processing becomes 200 mm/sec. Also, the CPU 2003 controls the transfer control unit 2008 such that the transfer voltage of the transfer unit 325 at the time of printing processing becomes 1.2 KV. Thus, the sheet information item includes various types of setting information as to the printer unit 203 at the time of executing printing processing, so the printing apparatus 105 can execute appropriate printing processing depending on the type of sheets.

As described above, with the present embodiment, as for available types of sheets at the printing apparatus 105, in addition to the types of sheets corresponding to the Type-1 sheet information, new sheet information is registered from Type 3, whereby the Type-2 sheet information can be registered (generated). Also, new Type-2 sheet information can be generated from among the Type-1 sheet information. Thus, the type of sheets corresponding to one of the Type-1 sheet information and the Type-2 sheet information can be employed for printing processing at the printing apparatus 105. With regard to the sheets corresponding to the Type-2 sheet information items, the setting permission information item indicating the combinations of the settable contents regarding each of the plurality of printing setting items for performing printing processing can be selected from among the setting permission information provided as to the Type-2 sheet information.

According to the present embodiment thus described, even registering (adding) new sheet information items that the printing apparatus can use does not increase the setting permission information indicating the combinations of the settable contents regarding each of the plurality of printing setting items for performing printing processing. Also, even in the event of registering (adding) new sheet information that the printing apparatus can use, the printing settings of the plurality of printing setting items can be appropriately performed by selecting appropriate setting permission information.

Second Exemplary Embodiment

Next, a second embodiment according to the present invention will be described. The second embodiment is a modification of the first embodiment. The difference between these is in that with the first embodiment, the image data employed for the printer unit 203 executing printing processing has been input from the scanner unit 201, but with the second embodiment, the image data employed for the printer unit 203 executing printing processing is input from the computer terminal 233 via the external interface 202.

Figure 19:
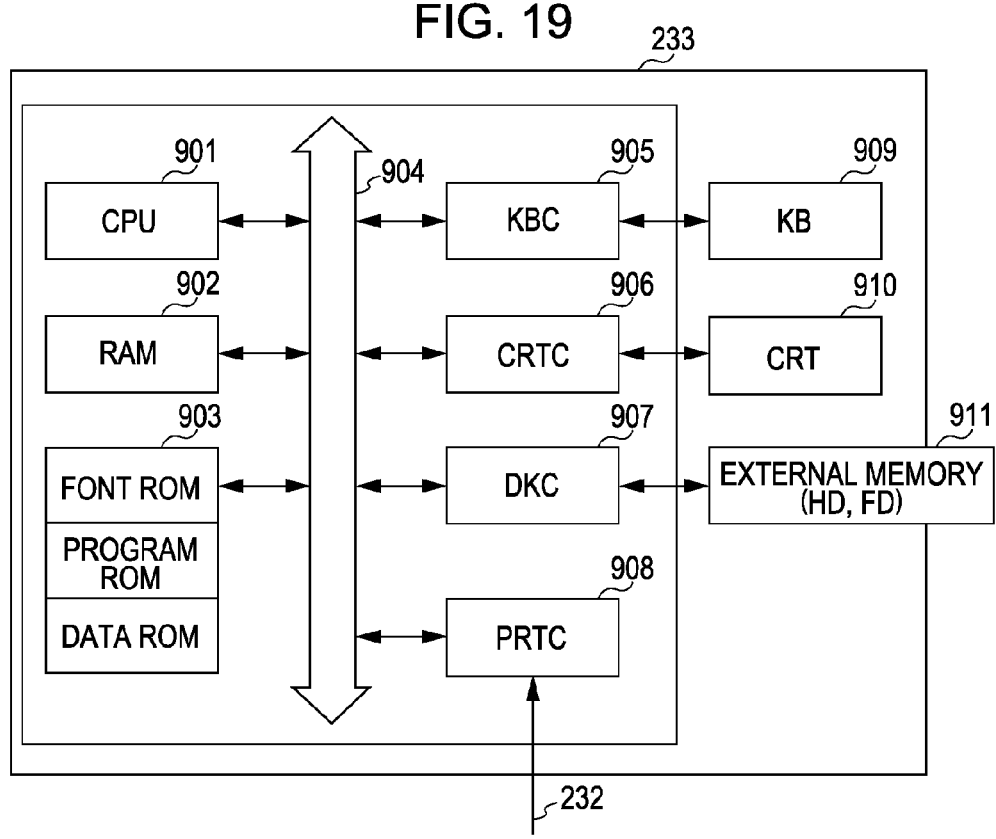
FIG. 19 is a diagram illustrating an example configuration of a computer terminal.

FIG. 19 is a diagram illustrating the configuration of the computer terminal 233 serving as an external device.

In FIG. 19, the computer terminal 233 includes a CPU 901 configured to execute document processing wherein figures, images, characters, tables (including spreadsheets, etc.) and the like are mixed based on ROM 903 serving as program ROM, a document processing program stored in external memory 911, or the like. The CPU 901 integrally controls respective bus devices connected to a system bus 904. Also, the ROM 903 serving as program ROM, or the external memory 911 stores an operating system program (hereafter, referred to as OS), a later-described printer driver, and so forth. The ROM 903 serving as font ROM, or the external memory 911 stores font data and so forth employed for document processing. Also, the ROM 903 serving as data ROM, or the external memory 911 stores various types of data employed for document processing and so forth. RAM 902 serves as the main memory, work area, and so forth of the CPU 901.

A keyboard controller (KBC) 905 controls key input from a keyboard 909 or unshown pointing device. A CRT controller (CRTC) 906 controls display of a CRT display (CRT) 910. A disk controller (DKC) 907 controls access to the external memory 911 such as a hard disk (HD), floppy (registered trademark) disk (FD), and so forth. The external memory 911 stores a boot program, various types of applications, a printer-control command generating program (hereafter, printer driver), and so forth. A printer controller (PRTC) 908 is connected to the printing apparatus 105 via the network 232, and executes communication control processing with the printing apparatus 105.

Figure 25:
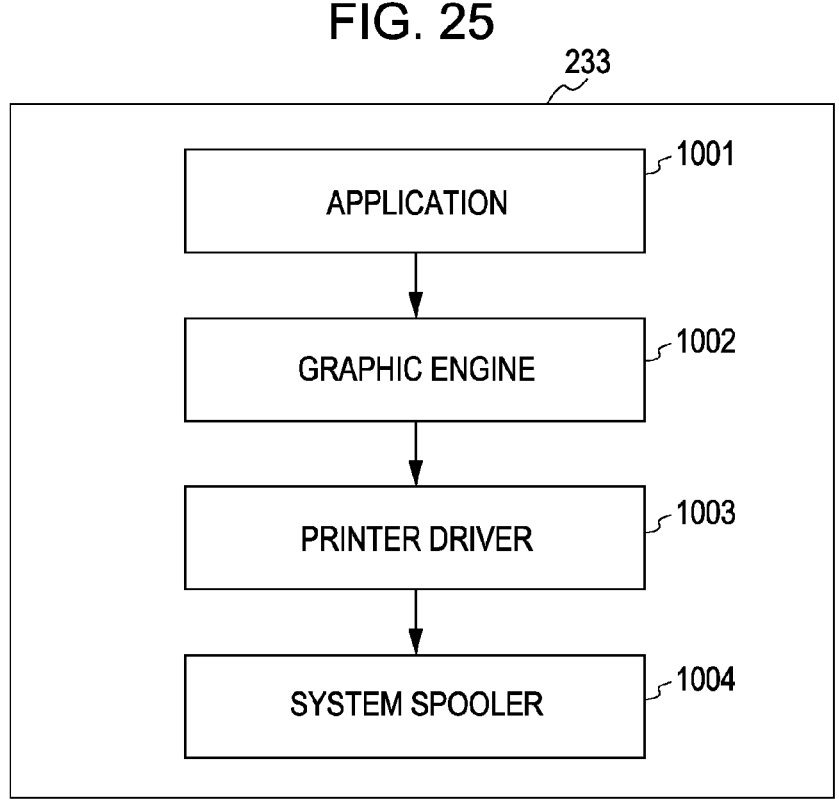
FIG. 25 is an example software structure diagram of a computer terminal 233.

FIG. 25 is a software structure diagram of the computer terminal 233. An application 1001, a graphic engine 1002, a printer driver 1003, and a system spooler 1004 exist as software programs stored in the external memory 911.

The application 1001 stored in the external memory 911 is loaded to the RAM 902, and executed. In the event of sending a printing job from the application 1001 to the printing apparatus 105, output (rendering) is performed with the graphic engine 1002 that has been loaded into the RAM 902, and is in an executable state.

The data output from the graphic engine 1002 is passed to the printer driver 1003. The printer driver 1003 is loaded to the RAM 902 from the external memory 911, and is executed by the CPU 901. The printer driver 1003 converts the data passed from the graphic engine 1002 into a control command that can be interpreted by the printing apparatus 105 (e.g., PDL command). The control command is arranged so as to be output to the printing apparatus 105 via the system spooler 1004 loaded to the RAM 902 by the OS, and the network 232. Let us refer to such a control command as a printing job.

Note that in order to generate a printing job using the printer driver 1003, it is necessary to set printing processing conditions (indicating the combinations of the printing setting items such as the type of sheets employed for printing processing, specification of duplex/simplex printing, etc.) at the printing apparatus 105. The operator of the computer terminal 233 normally performs these settings through a window (screen displayed on the CRT 910) provided by the printer driver 1003. Subsequently, the printer driver 1003 adds the contents set by the operator of the computer terminal 233 through the window to a printing job as the printing processing conditions.

Figure 20:
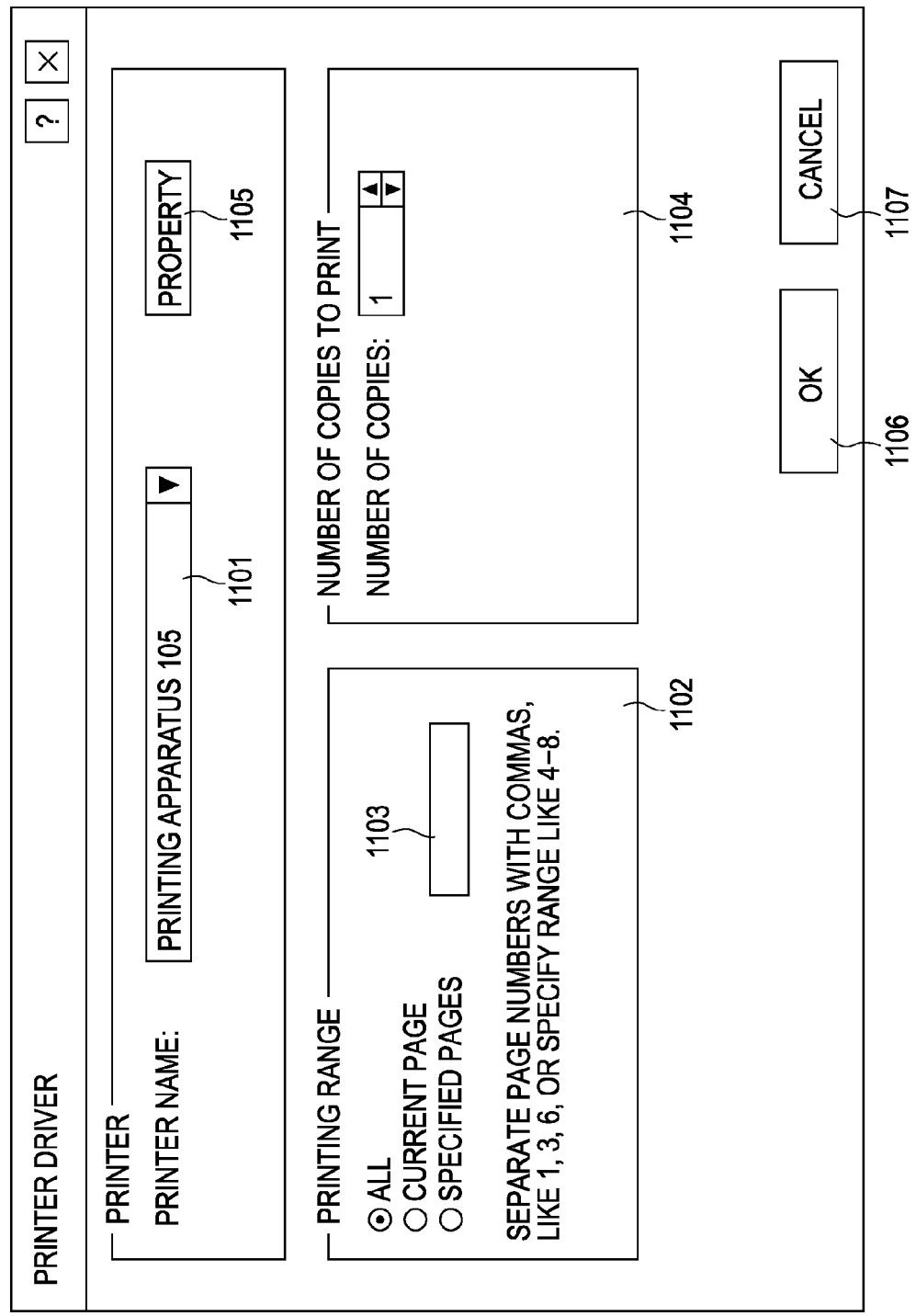
FIG. 20 is a diagram illustrating an example window configured to set printing processing setting items.

FIG. 20 is a diagram illustrating the window for the printer driver 1003 installed in the computer terminal 233 setting printing processing setting items.

The computer terminal 233 controls the CRT 910 to display the setting screen shown in FIG. 20 by activating the printer driver 1003 at the time of creating a document using the application 1001.

With the setting screen shown in FIG. 20, the operator (user) of the computer terminal 233 operates a printer name selection box 1101 using an unshown pointing device or the like. According to this operation, the printing apparatus 105 or the other printing apparatus is selected as a transmission destination to which the computer terminal 223 transmits a printing job. In FIG. 20, the computer terminal 233 selects the printing apparatus 105. Also, the operator operating the computer terminal 233 operates a printing range selection box 1102 using a pointing device or the like. According to this operation, desired pages are determined as a range to be printed by the printing apparatus 105 of the document generated by the application 1001. In the event of the operator selecting "ALL", the printer driver 1003 sets all pages of the document generated by the application 1001 as printing objects. Also, in the event of the operator selecting "CURRENT PAGE", the printer driver 1003 sets the page currently displayed on the CRT 910 of the document of a plurality of pages generated by the application 1001 as a printing object. Also, in the event of the operator selecting "SPECIFIED PAGES", the printer driver 1003 sets the pages input in an edit box 1103 of the document of a plurality of pages generated by the application 1001 as printing objects. Also, the printer driver 1003 sets the number of copies input in a printing number of copies setting box 1104 by the operator as the number of copies of printing objects.

Subsequently, the operator of the computer terminal 233 presses an OK button 1106 when completing the settings of the printing processing conditions of a printing job to be sent to the printing apparatus 105. In response to this operation, the printer driver 1003 starts the generation of a printing job. Note that the operator of the computer terminal 233 presses a CANCEL button 1107 in the case of canceling the generation of a printing job.

Figure 21:
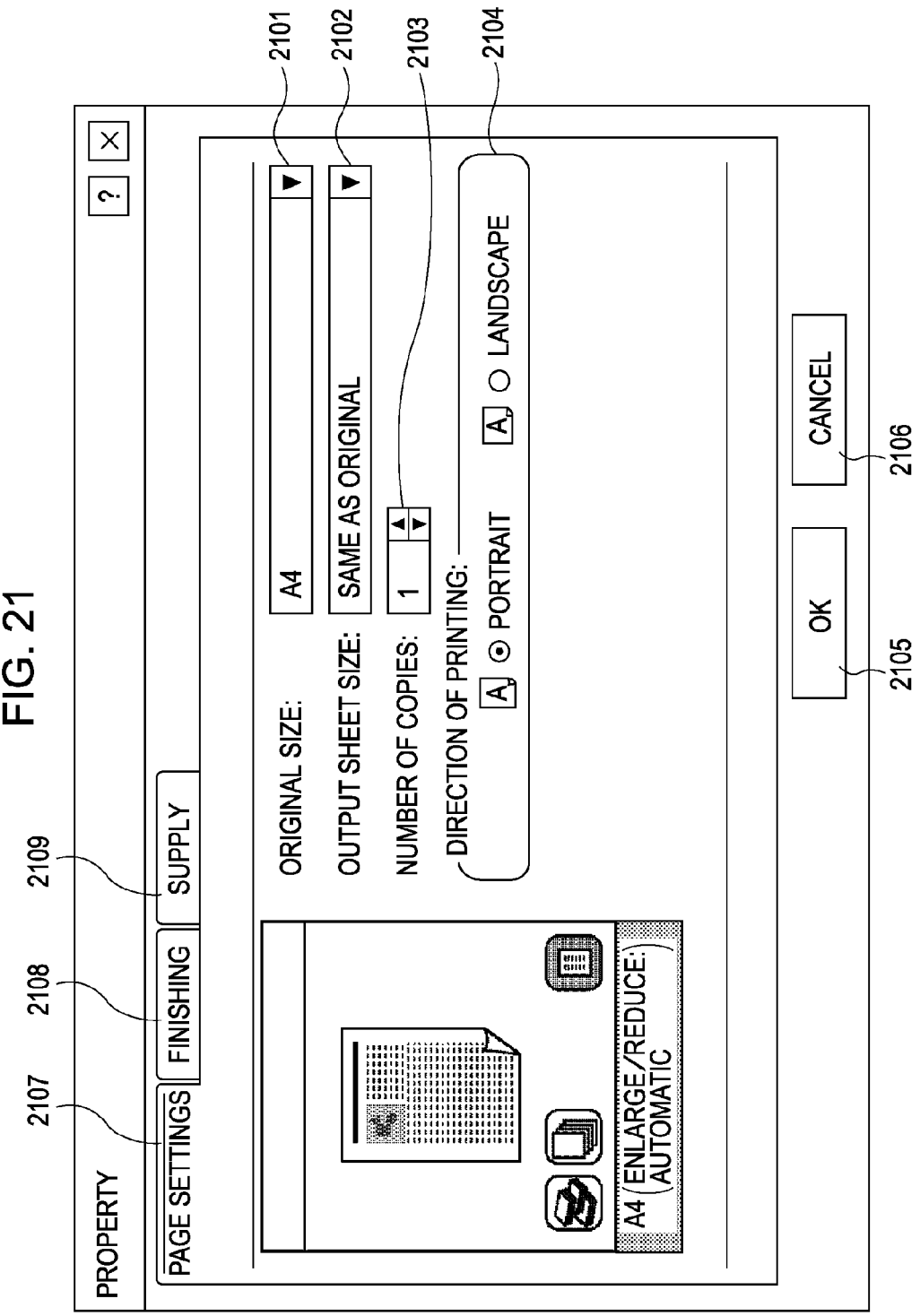
FIG. 21 is a diagram illustrating an example screen to be displayed when a property button is pressed.

FIG. 21 is a diagram illustrating a screen to be displayed when the operator presses a property button 1105 on the property setting screen of the printer driver shown in FIG. 20. The screen includes a page settings tab 2107, a finishing tab 2108, and a supply tab 2109.

The operator operating the computer terminal 233 operates an original size selection box 2101 using an unshown pointing device or the like. According to this operation, the printer driver 1003 (FIG. 25) selects the original size of the respective pages in the document to be edited by the application 1001. Note that the original size is usually specified with the document to be edited by the application 1001, so this original size is automatically selected (A4 in FIG. 21). Also, in the event of the operator selecting "SAME AS ORIGINAL" regarding an output sheet size selection box 2102, the printer driver 1003 selects A4 size as the sheet size employed for printing processing (output processing) at the printing apparatus 105. Note that as for the output sheet size, the operator can select a desired sheet size such as "A3 SIZE", "B5 SIZE", or the like other than "SAME AS ORIGINAL". However, in this case, a size different from the original size is selected, so the printer driver 1003 generates a printing job while modifying magnification. Also, the printer driver 1003 sets the input number of copies to a printing job in response to input of a desired number of copies to print regarding a number-of-copies selection box 2103. Also, the printer driver 1003 inputs the printing direction selected by the operator at a printing direction specification box 2104.

Subsequently, the printer driver 1003 determines the values input in the original size selection box 2101, output sheet size selection box 2102, number-of-copies selection box 2103, and printing direction specification box 2104 by the operator selecting an OK button 2105. On the other hand, the printer driver 1003 does not determine the values input in the boxes 2101 through 2104, and returns these to the initial settings by the operator selecting a CANCEL button 2106.

Figure 22:
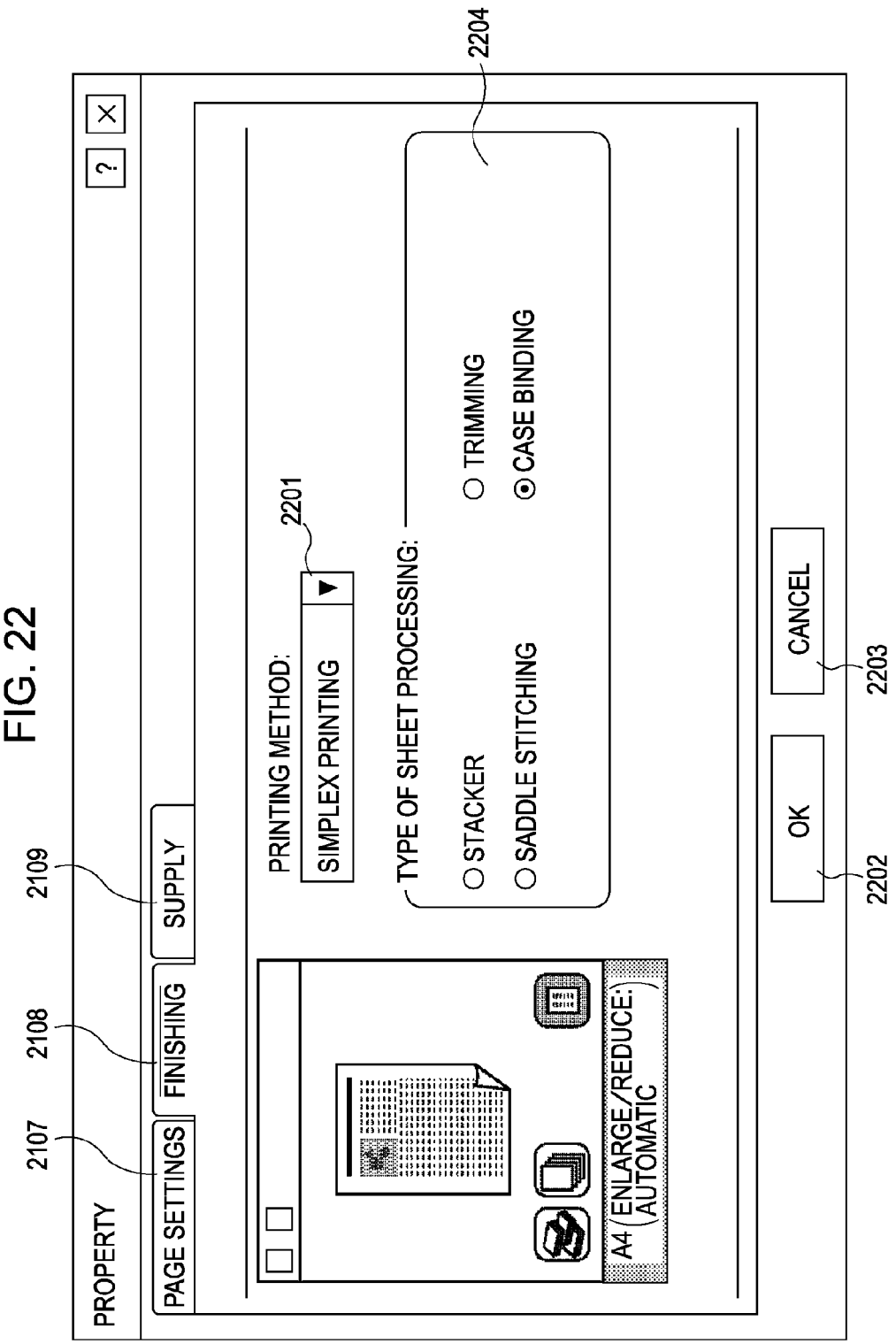
FIG. 22 is a diagram illustrating an example screen to be displayed when a finishing tab is selected.

FIG. 22 is a diagram illustrating a screen to be displayed when the operator selects a finishing tab 2108 on the property setting screen of the printer driver 1003 in FIG. 21.

The operator operating the computer terminal 233 operates a printing method selection box 2201 using an unshown pointing device or the like. According to this operation, the printer driver 1003 selects a printing method (one of the printing processing conditions) when allowing the printing apparatus 105 to print a printing job. Note that examples of a printing method include "SIMPLEX PRINTING" wherein the single sides alone of sheets are subjected to printing processing, and "DUPLEX PRINTING" wherein both sides of sheets are subjected to printing processing.

The operator operating the computer terminal 233 operates a sheet processing selection box 2204 using an unshown pointing device or the like. According to this operation, the printer driver 1003 selects a device serving as a discharge location configured to discharge the sheets subjected to printing processing at the printing apparatus 105. As for a device serving as a discharge location, there are provided the stacker device 104, trimming device 101, saddle-stitching device 102, and case-binding device 103.

Subsequently, the printer driver 1003 determines the values input in the printing method selection box 2201, and sheet processing selection box 2204 by the operator selecting an OK button 2202. On the other hand, the printer driver 1003 does not determine the values input in the printing method selection box 2201, and sheet processing selection box 2204, and returns these to the initial settings by the operator selecting a CANCEL button 2203.

Figure 23:
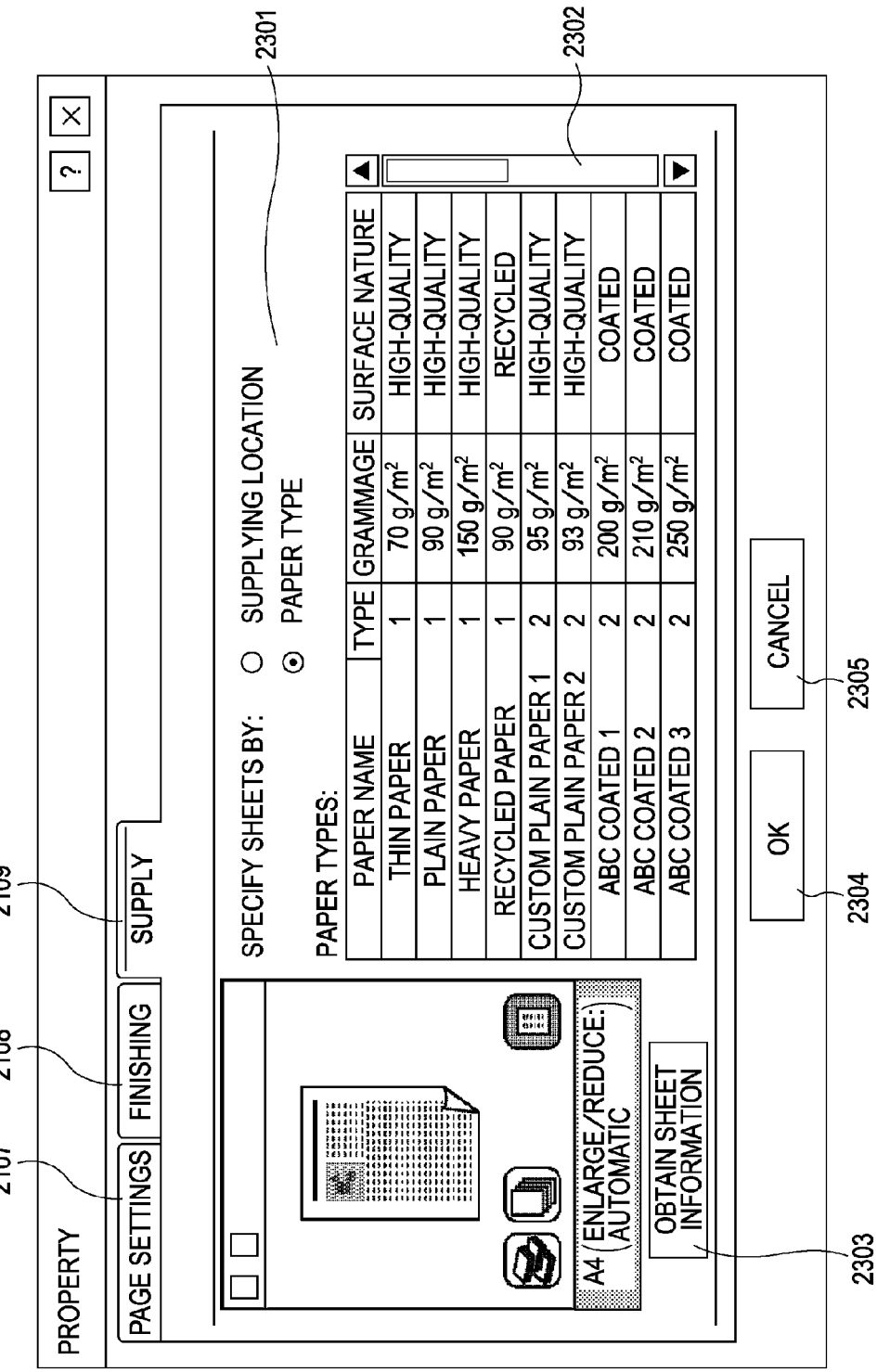
FIG. 23 is a diagram illustrating an example screen to be displayed when a supply tab is selected.

FIG. 23 is a diagram illustrating a screen to be displayed when the operator selects a supply tab 2109 on the property setting screen of the printer driver 1003 in FIG. 21.

The operator operating the computer terminal 233 operates a sheet supply method selection box 2301 using a pointing device or the like (not shown). According to this operation, the printer driver 1003 selects a method for specifying sheets employed when allowing the printing apparatus 105 to print a printing job. Note that with the example shown in FIG. 23, a specifying method using the type of sheets is selected as a method for specifying sheets. Subsequently, in the event of the operator selecting a specifying method using the type of sheets, display 2302 is displayed to allow the operator to specify the type of sheets used. Note that as for sheets to be displayed on the 2302, only the sheets equivalent to the above-mentioned Type 1 are displayed at the time of the printer driver 1003 being installed in the computer terminal 233. However, as described above, the operator may newly register Type-3 sheet information as Type-2 sheet information, whereby the printing apparatus 105 can employ new sheets at printing processing.

However, unless the printer driver 1003 obtains the sheet information relating to a sheet newly registered at the printing apparatus 105, the printer driver 1003 cannot select the Type-2 sheets as sheets to be employed at printing processing. Therefore, an obtain sheet information key 2303 is provided on the screen shown in FIG. 23. The operator operating the computer terminal 233 selects the obtain sheet information key 2303, whereby the Type-2 sheet information (table shown in FIG. 11) can be transferred from the printing apparatus 105 to the external memory 911 of the computer terminal 233. Subsequently, the printer driver 1003 of the computer terminal 233 can display the Type-2 sheet information stored in the external memory 911, and the Type-1 sheet information originally included in the printer driver 1003 as the display 2302. The operator specifies the type of sheets employed for the printing processing of a printing job from among the display 2302 using the pointing device. Subsequently, the operator selects an OK button 2304, whereby the specified type of sheets is determined.

Upon the settings on the property setting screens of the printer driver shown in FIG. 21, FIG. 22, and FIG. 23 being completed (by the operator pressing the OK button 2105, OK button 2202, OK button 2304, or cancel button 2305), the screen returns to the printer driver setting screen shown in FIG. 20.

Subsequently, when the operator presses the OK button 1106 on the printer driver setting screen shown in FIG. 20, the external device generates one printing job by synthesizing the setting contents set on the property setting screen, and application data. Further, the computer terminal 233 sends the printing job to the printing apparatus 105.

Figure 24:
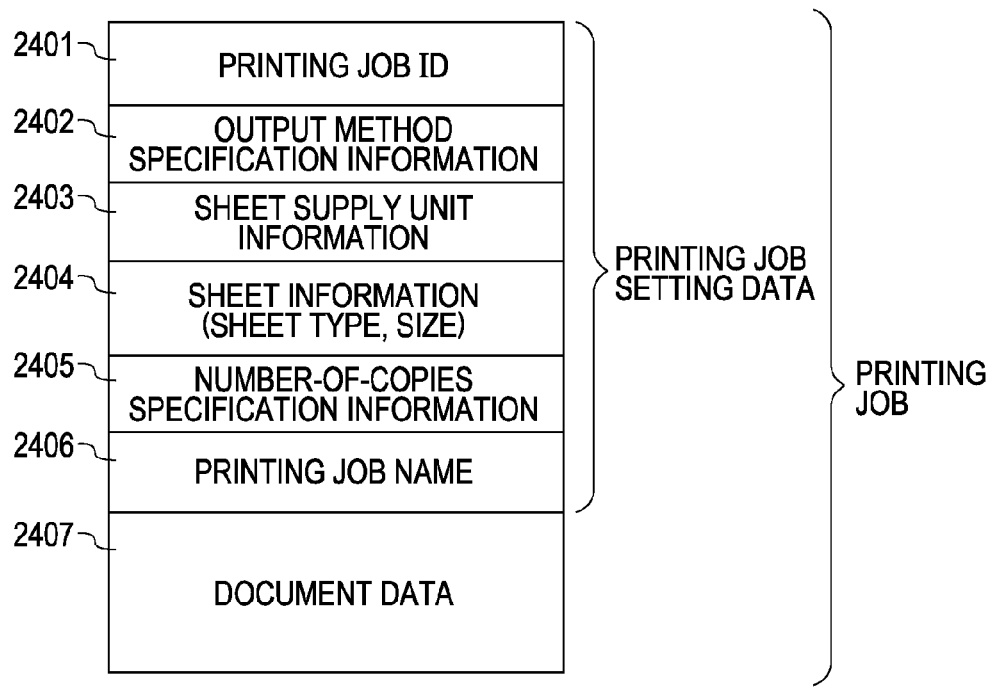
FIG. 24 is a diagram illustrating example data structure of a printing job.

Note that a specific example of the data structure of a printing job is shown in FIG. 24. FIG. 24 is a diagram illustrating the data structure of a printing job that the computer terminal 233 sends to the printing apparatus 105.

In FIG. 24, reference numeral 2401 denotes a printing job ID, which is a unique ID to be assigned to the printing job so as to identify the print job in the event that the computer terminal 233 sends a printing job to the printing apparatus 105. Reference numeral 2402 denotes output method specification information, which is information for identifying the printing method selected on the printing method selection box 1301. Reference numeral 2403 denotes sheet supply unit specification information, which is information for identifying the sheet supply unit selected by a sheet supply unit selection box (box to be displayed when "SPECIFY SHEETS BY SUPPLYING LOCATION" is selected in 2301). Reference numeral 2404 denotes sheet information, which is information including sheet size information for identifying the output sheet size selected in the output sheet size selection box 1202. The sheet information includes paper type information indicating paper type. In the event that the paper type selected on the display 2302 in FIG. 23 is "CUSTOM PLAIN PAPER 1", the paper type information is a sheet ID (0002-0001).

Reference numeral 2405 denotes number-of-copies specification information, which is information for determining the number of copies to print input in the number-of-copies setting box 1104. Reference numeral 2406 denotes a printing job name, and text data indicating a file name at the time of an application managing is assigned as a printing job name. Finally, reference numeral 2407 denotes document data, which is the data of a document generated by an application which operates on the computer terminal 233.

Note that the computer terminal 233 stores information equivalent to the Type-1 sheet information (FIG. 15) in the external memory 911 as setting permission information items indicating the combinations of the printing setting items. Also, the computer terminal 233 stores the table shown in FIG. 16 in the external memory 911. As with the printing apparatus 105 according to the first embodiment, the printer driver 1003 prevents the operator from performing a printing setting that prevents the printing apparatus 105 from performing printing processing based on the setting permission information stored in the external memory 911.

Figure 26:
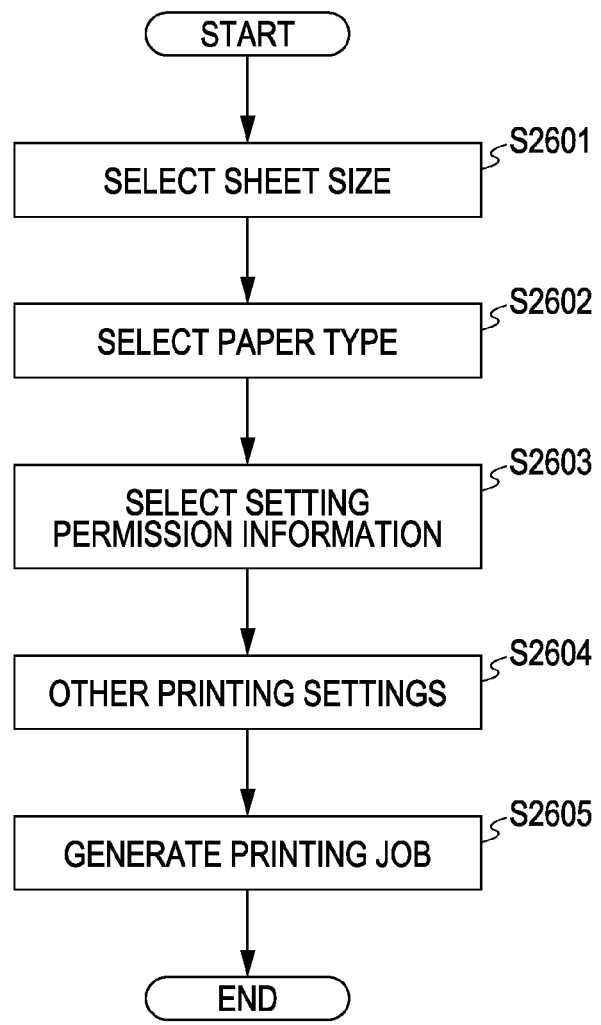
FIG. 26 is a flowchart illustrating an example operation executed by a printer driver.

Now, description will be made with reference to FIG. 26 regarding an operation wherein the printer driver 1003 selects one of a plurality of setting permission information correlated with Type 1 in FIG. 15 as to the Type-2 sheet information to generate a printing job. FIG. 26 illustrates an operation executed by the printer driver 1003 serving as a program operated by the CPU 901.

In step S2601 in FIG. 26, the printer driver 1003 selects the output sheet size selected on the screen shown in FIG. 21 as the sheet size of sheets employed for printing processing.

In step S2602, the printer driver 1003 selects the paper type selected by the operator on the screen shown in FIG. 23 as the paper type of sheets employed for printing processing. Note that with the example shown in FIG. 23, let us say that "CUSTOM PLAIN PAPER 1" (ID=0002-0001) registered as Type 2 has been selected.

In step S2603, the printer driver 1003 selects the setting permission information corresponding to the paper type selected in step S2602 with reference to the sheet information corresponding to the paper type selected in step S2602, and the tables shown in FIG. 15 and FIG. 16. Specifically, the printer driver 1003 selects "PLAIN PAPER" in FIG. 16, and further selects the setting permission information corresponding to "PLAIN PAPER" in FIG. 15 since the weight of the paper type selected in step S2602 is 95 g/m$^2$, and the surface nature is "HIGH QUALITY". With the setting permission information selected by the printer driver 1003 in step S2603, the trimming device is unavailable.

In step S2604, the printer driver 1003 performs the other printing settings based on the setting permission information selected in step S2603. Here, description will be made regarding the setting item of duplex printing, and the setting item of a discharge location, which serve as printing setting items. First, in the event of performing the setting of duplex printing, the operator selects duplex printing on the printing method selection box 1301 on the screen in FIG. 22. Here, with the setting permission information selected in step S2603, the setting of duplex printing is available, so the printer driver 1003 allows the operator to select duplex printing on the screen shown in FIG. 22. That is to say, the printer driver 1003 controls so as to allow the operator to execute duplex printing processing, in the event of employing "CUSTOM PLAIN PAPER 1" of Type 2 at the printing processing.

Next, in the event of performing the setting of a discharge location, the operator selects a device to be specified as a discharge location in the sheet processing selection box 1304 on the screen in FIG. 22. Here, with the setting permission information selected in step S2603, the setting of the trimming device 101 serving as a discharge location is unavailable, so the printer driver 1003 prevents the operator from selecting the trimming device 101 as a discharge location on the screen shown in FIG. 22. That is to say, the printer driver 1003 controls so as not to allow the operator to specify the trimming device 101 as a discharge location, in the event that "CUSTOM PLAIN PAPER 1" of Type 2 is employed at the printing processing, and also the output sheet size is "A4". Note that in the event that the output sheet size is "A3", the setting permission information to be selected in step S2603 differs, so in this case, the operator can select the trimming device 101. Note that in the event of the operator of the computer terminal 233 selecting the stacker device 104, case-binding device 103, or saddle-stitching device 102, as a discharge location, on the screen shown in FIG. 22, the printer driver 1003 controls the operating unit 204 to display an operating screen (not shown) for allowing the operator to set the processing as to sheets at each of the devices.

In step S2605, the printer driver 1003 generates a printing job based on the printing settings set in the respective steps of step S2601 through step S2604, and transfers this to the printing apparatus 105. Note that the printing apparatus 105 which received the printing job generated by the printer driver 1003 executes printing processing by analyzing the printing job shown in FIG. 24 at the CPU 205 in accordance with the flowchart shown in FIG. 26.

Specifically, the CPU 2003, which controls the printer unit 201, controls the respective units of the printer unit 2003 based on the sheet information specified by the printing job. With the printing job, "CUSTOM PLAIN PAPER 1" (ID=0002-0001) has been selected as a paper type, as shown in FIG. 11, the sheet information indicates that the fixing temperature is 179° C., printing speed is 240 mm/sec, and transfer voltage is 1.0 KV. Therefore, the CPU 2003 controls the fixing control unit 2009 such that the fixing temperature of the fixing unit 327 at the time of printing processing becomes 179° C. Also, the CPU 2003 controls the sheet conveyance control unit 2004 such that the conveyance speed of sheets at the time of printing processing becomes 240 mm/sec. Also, the CPU 2003 controls the transfer control unit 2008 such that the transfer voltage of the transfer unit 325 at the time of printing processing becomes 1.0 KV. Thus, the sheet information includes various types of setting information as to the printer unit 203 at the time of executing printing processing, so the printing apparatus 105 can execute appropriate printing processing depending on the type of sheets.

As described above, with the present embodiment, as for available types of sheets with a printing job, in addition to the types of sheets corresponding to the Type-1 sheet information items, new sheet information can be obtained from the printing apparatus 105. Also, new Type-2 sheet information items can be generated from among the Type-1 sheet information. Thus, the type of sheets corresponding to one of the Type-1 sheet information items and the Type-2 sheet information items can be employed for printing processing at the printing apparatus 105. With regard to the sheets corresponding to the Type-2 sheet information, the setting permission information indicating the combinations of the settable contents regarding each of the plurality of printing setting items for performing printing processing can be selected from among the setting permission information items provided as to the Type-2 sheet information items.

According to the present embodiment thus described, even registering (adding) new sheet information that the printing apparatus can use does not increase the setting permission information indicating the combinations of the settable contents regarding each of the plurality of printing setting items for the printer driver to generate a printing job. Also, even in the event of registering (adding) new sheet information that the printing apparatus can use, the printer driver can appropriately execute the printing settings of the plurality of printing setting items by selecting appropriate setting permission information following obtaining the sheet information from the printing apparatus.

Other Exemplary Embodiments

With the first and second embodiments, the setting permission information has been prepared for each sheet size as different setting permission information items, but other arrangements may be made instead of this. For example, an arrangement may be made wherein one setting permission information item is provided as to a paper type regardless of sheet size.

Also, the present invention can provide a recording medium in which software program code for realizing the above embodiment functions is recorded, which can be supplied to a system or device. In this case, the computer of the system or device thereof reads out and executes the program code stored in the recording medium, thereby realizing the above embodiment functions. In this case, the program code itself read out from the recording medium realizes the above embodiment functions, and the recording medium storing the program code thereof makes up the present invention.

As many apparently widely different embodiments of the present invention can be made, it is to be understood that the invention is not limited to the specific embodiments thereof except as defined in the appended claims.

The scope of the following claims is to be accorded the broadest interpretation so as to encompass all modifications, equivalent structures and functions.

This application claims the benefit of Japanese Application No. 2006-154837 filed Jun. 2, 2006, which is hereby incorporated by reference herein in its entirety.

What is claimed is:

1. A printing apparatus comprising: a printing unit configured to perform printing processing; a first storing unit configured to store sheet information regarding a sheet available in the printing processing and setting permission information indicating whether to permit a specific printing setting when the printing processing is performed, wherein the sheet information and the
setting permission information are stored in association with each other;
a registration unit configured to register new sheet information;
a second storing unit configured to store information which is referred to for determining sheet information corresponding to the new sheet information registered by the registration unit from among a plurality of pieces of sheet information previously stored in the first storing unit;
a determining unit configured to determine particular sheet information corresponding to the new sheet information from among the plurality of pieces of sheet information previously stored in the first storing unit by referring to the information stored by the second storing unit; and
a control unit configured to control the printing unit to perform the printing processing based on the setting permission information corresponding to the particular sheet information determined by the determining unit in a case where the printing processing using the new sheet information is performed,
wherein the sheet information includes property information that indicates grammage of a sheet.

2. The printing apparatus according to claim 1,
wherein the sheet information includes property information indicating a property of a sheet, and
wherein the determining unit determines the particular sheet information based on the property information included in the new sheet information.

3. The printing apparatus according to claim 2, wherein the property information indicates surface nature of a sheet.

4. The printing apparatus according to claim 1, wherein the setting permission information is information indicating whether to permit duplex printing.

5. The printing apparatus according to claim 1, wherein the setting permission information is information regarding a supply source of a sheet used in the printing processing.

6. The printing apparatus according to claim 1, wherein the setting permission information is information regarding a discharge location of a sheet on which the printing processing has been performed.

7. A method for a printing apparatus, the method comprising: performing printing processing; storing sheet information regarding a sheet available in the printing processing and setting permission information indicating whether to permit a specific printing setting when the printing processing is performed, wherein the sheet information and the setting permission information are stored in association with each other;
registering new sheet information; storing information which is referred to for determining sheet information corresponding to the registered new sheet information from among a plurality of pieces of sheet information previously stored;
determining particular sheet information corresponding to the new sheet information from among the previously stored plurality of pieces of sheet information by referring to the stored information which is referred to for determining sheet information; and
controlling performing printing processing to perform the printing processing based on the setting permission information corresponding to the determined particular sheet information in a case where the printing processing using the new sheet information is performed,
wherein the sheet information includes property information that indicates grammage of a sheet.

8. A non-transitory computer-readable medium storing a program causing a printing apparatus to perform the method according to claim 7.

9. The printing apparatus according to claim 1, wherein the determining unit determines the particular sheet information corresponding to the new sheet information when the printing processing using the new sheet information is performed.

10. The printing apparatus according to claim 1, wherein the setting permission information is for determining a printing setting settable by a user.

* * * * *